(12) United States Patent
Busany et al.

(10) Patent No.: US 12,470,591 B2
(45) Date of Patent: Nov. 11, 2025

(54) ANALYTICAL ATTACK GRAPH ABSTRACTION FOR RESOURCE-EFFICIENCIES

(71) Applicant: Accenture Global Solutions Limited, Dublin (IE)

(72) Inventors: Nimrod Busany, Tel Aviv (IL); Dan Klein, Rosh Ha'ayin (IL); Rafi Shalom, Givatayim (IL)

(73) Assignee: Accenture Global Solutions Limited, Dublin (IE)

( * ) Notice: Subject to any disclaimer, the term of this patent is extended or adjusted under 35 U.S.C. 154(b) by 307 days.

(21) Appl. No.: 18/318,265

(22) Filed: May 16, 2023

(65) Prior Publication Data

US 2023/0379356 A1 Nov. 23, 2023

Related U.S. Application Data

(60) Provisional application No. 63/343,136, filed on May 18, 2022.

(51) Int. Cl.
*H04L 29/06* (2006.01)
*H04L 9/40* (2022.01)

(52) U.S. Cl.
CPC ...... *H04L 63/1441* (2013.01); *H04L 63/1416* (2013.01); *H04L 63/1425* (2013.01); *H04L 63/1433* (2013.01)

(58) Field of Classification Search
CPC ............. H04L 63/1416; H04L 63/1425; H04L 63/1433; H04L 63/1441
See application file for complete search history.

(56) References Cited

U.S. PATENT DOCUMENTS

| 5,521,910 A | 5/1996 | Matthews |
| 6,279,113 B1 | 8/2001 | Vaidya |
| (Continued) | | |

FOREIGN PATENT DOCUMENTS

| EP | 1559008 | 8/2005 |
| EP | 1768043 | 3/2007 |
| (Continued) | | |

OTHER PUBLICATIONS

3DS.com [online], "New Customer Experience," available on or before Aug. 7, 2020 via Internet Archive: Wayback Machine URL<https://web.archive.org/web/20200807204455/https://ifwe.3ds.com/transportation-mobility/new-customer-experience>, retrieved on Jul. 9, 2021, retrieved from URL<https://ifwe.3ds.com/transportation-mobility/new-customer-experience>, 9 pages.

(Continued)

*Primary Examiner* — Jeffrey C Pwu
*Assistant Examiner* — Thong P Truong
(74) *Attorney, Agent, or Firm* — Polsinelli PC

(57) ABSTRACT

Implementations include methods, systems, computer-readable storage medium for mitigating cyber security risk of an enterprise network. A method includes: receiving an initial analytic attack graph (AAG) that is representative of paths within the enterprise network with respect to at least one target asset, the initial AAG comprising nodes and edges between the nodes; identifying, from the nodes of the initial AAG, a plurality of node groups, each node group including two or more nodes having at least one common attribute; generating an abstract AAG from the initial AAG, the abstract AAG including at least one abstract node, wherein each node group of the initial AAG is represented by a respective abstract node of the abstract AAG; determining a set of remedial actions at least partially based on the abstract AAG; and executing remedial actions in the set of remedial (Continued)

actions to reduce a cyber security risk to the enterprise network.

18 Claims, 7 Drawing Sheets

(56) References Cited

U.S. PATENT DOCUMENTS

| | | |
|---|---|---|
| 6,487,666 B1 | 11/2002 | Shanklin et al. |
| 7,540,025 B2 | 5/2009 | Tzadikario |
| 7,703,138 B2 | 4/2010 | Desai et al. |
| 7,904,962 B1 | 3/2011 | Jajodia et al. |
| 8,099,760 B2 | 1/2012 | Cohen et al. |
| 8,176,561 B1 | 5/2012 | Hurst et al. |
| 8,656,493 B2 | 2/2014 | Capalik |
| 8,881,288 B1 | 11/2014 | Levy et al. |
| 9,256,739 B1 | 2/2016 | Roundy et al. |
| 9,563,771 B2 | 2/2017 | Lang et al. |
| 9,633,306 B2 | 4/2017 | Liu et al. |
| 10,084,804 B2 | 9/2018 | Kapadia et al. |
| 10,291,645 B1 | 5/2019 | Frantzen et al. |
| 10,382,473 B1 | 8/2019 | Ashkenazy et al. |
| 10,447,721 B2 | 10/2019 | Lasser |
| 10,447,727 B1 | 10/2019 | Hecht |
| 10,601,854 B2 | 3/2020 | Lokamathe et al. |
| 10,642,840 B1 | 5/2020 | Attaluri et al. |
| 10,659,488 B1 | 5/2020 | Rajasooriya et al. |
| 10,771,492 B2 | 9/2020 | Hudis et al. |
| 10,848,515 B1 | 11/2020 | Pokhrel et al. |
| 10,868,825 B1 | 12/2020 | Dominessy et al. |
| 10,873,533 B1 | 12/2020 | Ismailsheriff et al. |
| 10,956,566 B2 | 3/2021 | Shu et al. |
| 10,958,667 B1 | 3/2021 | Maida et al. |
| 11,089,040 B2 | 8/2021 | Jang et al. |
| 11,128,654 B1 | 9/2021 | Joyce et al. |
| 11,159,555 B2 | 10/2021 | Hadar et al. |
| 11,184,385 B2 | 11/2021 | Hadar et al. |
| 11,232,235 B2 | 1/2022 | Hadar et al. |
| 11,277,431 B2 | 3/2022 | Hassanzadeh et al. |
| 11,281,806 B2 | 3/2022 | Hadar et al. |
| 11,283,824 B1 | 3/2022 | Berger et al. |
| 11,283,825 B2 | 3/2022 | Grabois et al. |
| 11,411,976 B2 | 8/2022 | Basovskiy et al. |
| 11,483,213 B2 | 10/2022 | Engelberg et al. |
| 11,533,332 B2 | 12/2022 | Engelberg et al. |
| 11,750,657 B2 | 9/2023 | Hadar et al. |
| 2005/0138413 A1 | 6/2005 | Lippmann et al. |
| 2005/0193430 A1 | 9/2005 | Cohen et al. |
| 2006/0037077 A1 | 2/2006 | Gadde et al. |
| 2008/0044018 A1 | 2/2008 | Scrimsher et al. |
| 2008/0289039 A1 | 11/2008 | Rits et al. |
| 2008/0301765 A1 | 12/2008 | Nicol et al. |
| 2009/0077666 A1 | 3/2009 | Chen et al. |
| 2009/0138590 A1 | 5/2009 | Lee et al. |
| 2009/0307772 A1 | 12/2009 | Markham et al. |
| 2009/0319248 A1 | 12/2009 | White et al. |
| 2010/0058456 A1 | 3/2010 | Jajodia et al. |
| 2010/0138925 A1 | 6/2010 | Barai et al. |
| 2010/0174670 A1 | 7/2010 | Malik et al. |
| 2011/0035803 A1 | 2/2011 | Lucangeli Obes et al. |
| 2011/0061104 A1 | 3/2011 | Sarraute Yamada et al. |
| 2011/0093916 A1 | 4/2011 | Lang et al. |
| 2011/0093956 A1 | 4/2011 | Laarakkers et al. |
| 2013/0097125 A1 | 4/2013 | Marvasti et al. |
| 2013/0219503 A1 | 8/2013 | Amnon et al. |
| 2014/0082738 A1 | 3/2014 | Bahl |
| 2014/0173740 A1 | 6/2014 | Albanese et al. |
| 2015/0047026 A1 | 2/2015 | Neil et al. |
| 2015/0106867 A1 | 4/2015 | Liang |
| 2015/0172309 A1 | 6/2015 | Zandani et al. |
| 2015/0199207 A1 | 7/2015 | Lin et al. |
| 2015/0261958 A1 | 9/2015 | Hale et al. |
| 2015/0326601 A1 | 11/2015 | Grondin et al. |
| 2015/0350018 A1 | 12/2015 | Hui et al. |
| 2016/0105454 A1 | 4/2016 | Li et al. |
| 2016/0205122 A1 | 7/2016 | Bassett |
| 2016/0277423 A1 | 9/2016 | Apostolescu et al. |
| 2016/0292599 A1 | 10/2016 | Andrews et al. |
| 2016/0301704 A1 | 10/2016 | Hassanzadeh et al. |
| 2016/0301709 A1 | 10/2016 | Hassanzadeh et al. |
| 2017/0012836 A1 | 1/2017 | Tongaonkar et al. |
| 2017/0032130 A1 | 2/2017 | Joseph et al. |
| 2017/0041334 A1 | 2/2017 | Kahn et al. |
| 2017/0078322 A1 | 3/2017 | Seiver et al. |
| 2017/0085595 A1 | 3/2017 | Ng et al. |
| 2017/0163506 A1 | 6/2017 | Keller |
| 2017/0230410 A1 | 8/2017 | Hassanzadeh et al. |
| 2017/0318050 A1 | 11/2017 | Hassanzadeh et al. |
| 2017/0324768 A1 | 11/2017 | Crabtree et al. |
| 2017/0364702 A1 | 12/2017 | Goldfarb et al. |
| 2017/0366416 A1 | 12/2017 | Beecham et al. |
| 2018/0013771 A1 | 1/2018 | Crabtree et al. |
| 2018/0103052 A1 | 4/2018 | Choudhury et al. |
| 2018/0152468 A1 | 5/2018 | Nor et al. |
| 2018/0159890 A1 | 6/2018 | Warnick et al. |
| 2018/0183827 A1 | 6/2018 | Zorlular et al. |
| 2018/0255077 A1 | 9/2018 | Paine |
| 2018/0255080 A1 | 9/2018 | Paine |
| 2018/0295154 A1 | 10/2018 | Crabtree et al. |
| 2018/0367548 A1 | 12/2018 | Stokes, III et al. |
| 2019/0052663 A1 | 2/2019 | Lee et al. |
| 2019/0052664 A1 | 2/2019 | Kibler et al. |
| 2019/0087737 A1 | 3/2019 | Pendar et al. |
| 2019/0132344 A1 | 5/2019 | Lem et al. |
| 2019/0141058 A1 | 5/2019 | Hassanzadeh et al. |
| 2019/0182119 A1 | 6/2019 | Ratkovic et al. |
| 2019/0188389 A1 | 6/2019 | Peled et al. |
| 2019/0230129 A1 | 7/2019 | Digiambattista et al. |
| 2019/0312898 A1 | 10/2019 | Verma et al. |
| 2019/0319987 A1 | 10/2019 | Levy et al. |
| 2019/0362279 A1 | 11/2019 | Douglas |
| 2019/0373005 A1 | 12/2019 | Bassett |
| 2020/0014718 A1 | 1/2020 | Joseph Durairaj et al. |
| 2020/0042328 A1 | 2/2020 | Gupta |
| 2020/0042712 A1 | 2/2020 | Foo et al. |
| 2020/0045069 A1 | 2/2020 | Nanda et al. |
| 2020/0099704 A1 | 3/2020 | Lee et al. |
| 2020/0099708 A1* | 3/2020 | Mathews ............ H04L 41/142 |
| 2020/0112487 A1 | 4/2020 | Inamdar et al. |
| 2020/0128047 A1 | 4/2020 | Biswas et al. |
| 2020/0137104 A1 | 4/2020 | Hassanzadeh et al. |
| 2020/0175175 A1 | 6/2020 | Hadar et al. |
| 2020/0177615 A1 | 6/2020 | Grabois et al. |
| 2020/0177616 A1 | 6/2020 | Hadar et al. |
| 2020/0177617 A1 | 6/2020 | Hadar et al. |
| 2020/0177618 A1 | 6/2020 | Hassanzadeh et al. |
| 2020/0177619 A1 | 6/2020 | Hadar et al. |
| 2020/0272972 A1 | 8/2020 | Harry et al. |
| 2020/0296137 A1 | 9/2020 | Crabtree et al. |
| 2020/0311630 A1 | 10/2020 | Risoldi et al. |
| 2020/0351295 A1 | 11/2020 | Nhlabatsi et al. |
| 2020/0358804 A1 | 11/2020 | Crabtree et al. |
| 2021/0006582 A1 | 1/2021 | Yamada et al. |
| 2021/0014265 A1 | 1/2021 | Hadar et al. |
| 2021/0099490 A1 | 4/2021 | Crabtree et al. |
| 2021/0105294 A1 | 4/2021 | Kruse et al. |
| 2021/0168175 A1 | 6/2021 | Crabtree et al. |
| 2021/0173711 A1 | 6/2021 | Crabtree et al. |
| 2021/0218770 A1 | 7/2021 | Ben-Yosef et al. |
| 2021/0248443 A1 | 8/2021 | Shu et al. |
| 2021/0273978 A1 | 9/2021 | Hadar et al. |
| 2021/0288995 A1 | 9/2021 | Attar et al. |
| 2021/0336981 A1 | 10/2021 | Akella et al. |
| 2021/0350248 A1* | 11/2021 | Rogers ................. G06N 5/027 |
| 2021/0409426 A1 | 12/2021 | Engelberg et al. |
| 2021/0409439 A1 | 12/2021 | Engelberg et al. |
| 2022/0014445 A1 | 1/2022 | Engelberg et al. |
| 2022/0014534 A1 | 1/2022 | Basovskiy et al. |
| 2022/0021698 A1 | 1/2022 | Hadar et al. |
| 2022/0038491 A1 | 2/2022 | Hadar et al. |
| 2022/0051111 A1 | 2/2022 | Hadar et al. |
| 2022/0070202 A1 | 3/2022 | Busany et al. |
| 2022/0124069 A1* | 4/2022 | Chiu .................. H04L 63/0263 |
| 2022/0124115 A1 | 4/2022 | Grabois et al. |

(56) References Cited

U.S. PATENT DOCUMENTS

| | | | |
|---|---|---|---|
| 2022/0129590 | A1 | 4/2022 | Hadar et al. |
| 2022/0131894 | A1 | 4/2022 | Hassanzadeh et al. |
| 2022/0150270 | A1 | 5/2022 | Klein et al. |
| 2022/0182406 | A1 | 6/2022 | Inokuchi |
| 2022/0188460 | A1 | 6/2022 | Hadar et al. |
| 2022/0263855 | A1 | 8/2022 | Engelberg et al. |
| 2022/0337617 | A1 | 10/2022 | Basovskiy et al. |
| 2023/0021961 | A1 | 1/2023 | Engelberg et al. |
| 2023/0034910 | A1 | 2/2023 | Engelberg et al. |
| 2023/0067128 | A1 | 3/2023 | Engelberg et al. |
| 2023/0067777 | A1 | 3/2023 | Hadar et al. |
| 2023/0076372 | A1 | 3/2023 | Engelberg et al. |

FOREIGN PATENT DOCUMENTS

| | | |
|---|---|---|
| EP | 2385676 | 11/2011 |
| EP | 2816773 | 12/2014 |
| EP | 3644579 | 4/2020 |
| EP | 3664411 | 6/2020 |
| WO | WO 2018/002484 | 1/2018 |
| WO | WO 2020/242275 | 12/2020 |

OTHER PUBLICATIONS

Abraham et al. "A Predictive Framework for Cyber Security Analytics Using Attack Graphs." International Journal of Computer Networks & Communications (IJCNC). vol. 7, No. 1, Jan. 2015. (Year: 2015).

Abraham et al., "Cyber Security Analytics: A Stochastic Model for Security Quantification Using Absorbing Markov Chains," Journal of Communications, Dec. 2014, 9(12):899-907.

Abriola et al., "Bisimulations on Data Graphs," Journal of Artificial Intelligence Research, Jan. 2018, 61:171-213.

Almeida et al., "An ontological analysis of the notion of community in the RM-ODP enterprise language," Computer Standards & Interfaces, Mar. 2013, 35(3):257-268.

Alvarenga et al., "Discovering Attack Strategies Using Process Mining," Presented at Proceedings of The Eleventh Advanced International Conference on Telecommunications, Brussels, Belgium, Jun. 21-26, 2015, 119-125.

Amar et al., "Using finite-state models for log differencing," Proceedings of the 2018 26th ACM Joint Meeting on European Software Engineering Conference and Symposium on the Foundations of Software Engineering (ESEC/FSE 2018), Lake Buena Vista, Florida, Nov. 4-9, 2018, 49-59.

Annane et al., "BBO: BPMN 2.0 based ontology for business process representation," Presented at Proceedings of the 20th European Conference on Knowledge Management (ECKM 2019), Lisbonne, Portugal, Sep. 5-6, 2019, 49-59.

Ashton et al., "That 'internet of things' thing," RFID Journal, Jun. 22, 2009, 1 page.

Atoum et al., "A holistic cyber security implementation framework," Information Management & Computer Security, Jul. 2014, 22(3):251-264.

Barik et al., "Attack Graph Generation and Analysis Techniques," Defence Science Journal, Nov. 2016, 66(6):559-567.

Barrère et al., "Naggen: a Network Attack Graph GENeration Tool—IEE CNS 17 Poster," 2017 IEEE Conference on Communications and Network Security, Oct. 2017, Las Vegas, NV, USA, 378-379.

Bonacich, "Power and Centrality: A Family of Measures," American Journal of Sociology, Mar. 1987, 92(5):1170-1182.

Borgatti et al., "A Graph-theoretic perspective on centrality," Social Networks, Oct. 2006, 28(4):466-484.

Borgo et al., "Ontological Foundations of DOLCE," Theory and Applications of Ontology: Computer Applications, Aug. 5, 2010, 279-295.

Brazhuk, "Towards automation of threat modeling based on a semantic model of attack patterns and weaknesses," arXiv, Dec. 8, 2021, arXiv:2112.04231v1, 14 pages.

Burger et al., "Scaling to the end of silicon with edge architectures," Computer, Jul. 2004, 37(7):44-55.

Challenge.org [online], "Incorporating digital twin into internet cyber security—creating a safer future," May 2018, retrieved on Jul. 9, 2021, retrieved from URL<https://www.challenge.org/insights/digital-twin-cyber-security/>, 10 pages.

Chen et al., "Distributed Attack Modeling Approach Based on Process Mining and Graph Segmentation," Entropy, Sep. 2020, 22(9):1026, 21 pages.

Chen Zhong, Towards Agile Cyber Analysis: Leveraging Visualization as Functions in Collaborative Visual Analytics, IEEE:2017, pp. 1-2.

Cohen-Addad et al., "Hierarchical Clustering: Objective Functions and Algorithms," Journal of the ACM, Jun. 2019, 66(4):26, 42 pages.

Coltellese et al., "Triage of IoT Attacks Through Process Mining," Presented at Proceedings of On the Move to Meaningful Internet Systems Conference 2019, Rhodes, Greece, Oct. 21-25, 2019; Lecture Notes in Computer Science, Oct. 2019, 11877:326-344.

Cravero, "Big data architectures and the internet of things: A systematic mapping study," IEEE Latin America Transactions, Apr. 2018, 16(4):1219-1226.

CyberSecurityWorks.com [online], "MITRE Mapping of CISA KEVs and its Challenges," Jun. 29, 2022, retrieved on Oct. 4, 2022, retrieved from URL<https://cybersecurityworks.com/blog/cisa/mitre-mapping-of-cisa-kevs-and-its-challenges.html>, 6 pages.

Cycognito.com [online], "Identifying and Managing Vulnerabilities on All Your Attacker-Exposed Assets, All the Time: Benefits of the CyCognito Platform for Vulnerability Management," available on or before Oct. 22, 2020 via Internet Archive: Wayback Machine URL<https://web.archive.org/web/20201022120625/https://www.cycognito.com/vulnerability-management>, retrieved on Oct. 4, 2022, retrieved from URL<https://www.cycognito.com/vulnerability-management>, 15 pages.

Daniele et al., "An ontological approach to logistics," Enterprise Interoperability: Research and Applications in the Service-oriented Ecosystem, Oct. 11, 2013, 199-213.

Das et al., "V2W-BERT: A Framework for Effective Hierarchical Multiclass Classification of Software Vulnerabilities," CoRR, submitted on Feb. 23, 2021, arXiv:2102.11498v1, 11 pages.

Degen et al., "Gol: toward an axiomatized upper-level ontology," Presented at Proceedings of the International Conference on Formal Ontology in Information Systems, Ogunquit, Maine, USA, Oct. 17-19, 2001, 34-46.

Dovier et al., "An Efficient Algorithm for Computing Bisimulation Equivalence," Theoretical Computer Science, Jan. 23, 2004, 311(1-3):221-256.

Dovier, "Logic Programming and Bisimulation," Proceedings of the Technical Communications of the 31st International Conference on Logic Programming (ICLP 2015), Cork, Ireland, Aug. 31-Sep. 4, 2015, 14 pages.

Duarte et al., "Towards an Ontology of Requirements at Runtime," Formal Ontology in Information Systems, Jan. 2016, 283:255-268.

El Saddik, "Digital Twins: The Convergence of Multimedia Technologies," IEEE MultiMedia, Apr.-Jun. 2018, 25(2):87-92.

EP Extended Search Report in European Appln. No. 21191752.1, dated Jan. 4, 2022, 8 pages.

EP Extended Search Report in European Appln. No. 22157487.4, dated Jun. 9, 2022, 10 pages.

EP Extended Search Report in European Appln. No. 22187514.9, dated Nov. 29, 2022, 7 pages.

EP Extended Search Report in European Appln. No. 22193272.6, dated Jan. 25, 2023, 8 pages.

EP Search Report in European Application No. EP 19212981, dated Mar. 4, 2020, 6 pages.

EP Search Report in European Application No. EP19212974, dated Feb. 14, 2020, 8 pages.

EP Search Report in European Application No. EP19212976, dated Feb. 14, 2020, 8 pages.

EP Search Report in European Application. No. 21159421.3, dated Jun. 30, 2021, 11 pages.

EP Search Report in European Application. No. EP20185251, dated Oct. 21, 2020, 7 pages.

(56) References Cited

OTHER PUBLICATIONS

Fielder et al., "Decision support approaches for cyber security investment," Decision Support Systems, Jun. 2016, 86:13-23.
Foundations of Databases, 1st ed., Abiteboul et al. (eds.), 1995, Chapter 12, 38 pages.
Fundamentals of Business Process Management, 2nd ed., Dumas et al. (eds.), 2018, 546 pages.
Gailly et al., "Ontological Reengineering of the REA-EO using UFO," Presented at Proceedings of the International Workshop on Ontology-Driven Software Engineering, Orlando, FL, USA, Oct. 2009, 15 pages.
Gandomi et al., "Beyond the hype: Big data concepts, methods, and analytics," International Journal of Information Management, Apr. 2015, 35(2):137-144.
GE.com [online], "Predix Platform," available on or before Nov. 16, 2018 via Internet Archive: Wayback Machine URL<https://web.archive.org/web/20181116005032/https://www.ge.com/digital/iiot-platform>, retrieved on Jul. 9, 2021, retrieved from URL<https://www.ge.com/digital/iiot-platform>, 6 pages.
Genovese, "Data mesh: the newest paradigm shift for a distributed architecture in the data world and its application," Thesis for the degree of Computer Engineering, Politecnico di Torino, 2021, 76 pages.
Gergeleit et al., "Modeling Security Requirements and Controls for an Automated Deployment of Industrial IT Systems," Kommunikation und Bildverarbeitung in der Automation. Technologien für die intelligente Automation (Technologies for Intelligent Automation), Jan. 14, 2020, 12:217-231.
GitHub.com [online], "ALFA-group/BRON," available on or before Nov. 23, 2021 via Internet Archive: Wayback Machine URL<https://web.archive.org/web/20211123023700/https://github.com/ALFA-group/BRON>, retrieved on Oct. 4, 2022, retrieved from URL<https://github.com/ALFA-group/BRON>, 5 pages.
Giunchiglia et al., "Lightweight Ontologies," Technical Report DIT-07-071, University of Trento, Oct. 2007, 10 pages.
Gomez-Perez et al., "Ontology languages for the Semantic Web," IEEE Intelligent Systems, Feb. 2002, 17(1):54-60.
Grieves, "Virtually Intelligent Product Systems: Digital and Physical Twins", Complex Systems Engineering: Theory and Practice, Jul. 2019, 256:175-200.
Grigorescu et al., "CVE2ATT&CK: BERT-Based Mapping of CVEs to MITRE ATT&CK Techniques," Algorithms, Aug. 31, 2022, 15(9):314, 22 pages.
Guarino, "Formal Ontology in Information Systems," Presented at Proceedings of the 1st International Conference, Trento, Italy, Jun. 6-8, 1998, 3-15.
Guizzardi et al., "An Ontology-Based Approach for Evaluating the Domain Appropriateness and Comprehensibility Appropriateness of Modeling Languages," MoDELS, 2005, 691-705.
Guizzardi, "On Ontology, ontologies, Conceptualizations, Modeling Languages, and (Meta)Models," Presented at Proceedings of the 2007 conference on Databases and Information Systems IV: Selected Papers from the Seventh International Baltic Conference, Amsterdam, Netherlands, Jun. 5, 2007, 18 pages.
Guizzardi, "Ontological Foundations for Structural Conceptual Models," Thesis for the degree of Doctor, University of Twente, 2005, 441 pages.
Guizzardi, "Ontology, Ontologies and the "I" of FAIR," Data Intelligence, Jan. 1, 2020, 2(1-2):181-191.
Guizzardi, "The role of foundational ontology for conceptual modeling and domain ontology representation," Presented at Proceedings of the 7th International Baltic Conference on Databases and Information Systems, Vilnius, Lithuania, Jul. 3-6, 2006, 9 pages.
Hadar et al., "Big Data Analytics on Cyber Attack Graphs for Prioritizing Agile Security Requirements", Proceedings of the 2019 IEEE 27th International Requirements Engineering Conference, Sep. 23-27, 2019, Jeju Island, Kora, 330-339.
Hadar et al., "Cyber Digital Twin Simulator for Automatic Gathering and Prioritization of Security Controls Requirements," Proceedings of the 2020 IEEE 28th International Requirements Engineering Conference, Aug. 31-Sep. 4, 2020, Zurich, Switzerland, 250-259.
Hansen et al., "Model-in-the-Loop and Software-in-the-Loop Testing of Closed-Loop Automotive Software with Arttest," Informatik, 2017, 13 pages.
Hasan et al., "Towards Optimal Cyber Defense Remediation in Energy Delivery Systems", Proceedings of 2019 IEEE Global Communications Conference, Dec. 9-13, 2019, Waikoloa, Hawaii, 7 pages.
Hassani et al., "Artificial Intelligence (AI) or Intelligence Augmentation (IA): What Is the Future?," AI, Apr. 12, 2020, 1(2):143-155.
Hemberg et al., "BRON—Linking Attack Tactics, Techniques, and Patterns with Defensive Weaknesses, Vulnerabilities and Affected Platform Configurations," arXiv, Oct. 1, 2020, arXiv:2010.00533v1, 14 pages.
Hemberg et al., "Using a Collated Cybersecurity Dataset for Machine Learning and Artificial Intelligence," arXiv, Aug. 5, 2021, arXiv:2108.02618v1, 5 pages.
Herre, "General Formal Ontology (GFO): A Foundational Ontology for Conceptual Modelling," Theory and Applications of Ontology: Computer Applications, Aug. 12, 2010, 297-345.
Hofner et al., "Dijkstra, Floyd and Warshall meet Kleene," Formal Aspects of Computing, Jul. 2012, 24(4-6):459-476.
Homer et al., "Improving Attack Graph Visualization through Data Reduction and Attack Grouping," Proceedings of the VizSEC 2008 Workshop on Visualization for Computer Security, Cambridge, MA, USA, Sep. 15, 2008, 17 pages.
Horrocks et al., "SWRL: A Semantic Web Rule Language Combining OWL and RuleML," W3C Member Submission, May 21, 2004, 24 pages.
Husák et al., "Survey of Attack Projection, Prediction, and Forecasting in Cyber Security," IEEE Communications Surveys & Tutorials, Sep. 24, 2018, 21(1):640-660.
Idika et al., "Extending attack graph-based security metrics and aggregating their application," IEEE Transactions on Dependable and Secure Computing, Jan./Feb. 2012, 9(1):75-85.
IEEE, "IEEE Standard for extensible Event Stream (XES) for Achieving Interoperability in Event Logs and Event Stream," IEEE Std 1849™-2016, Sep. 22, 2016, 50 pages.
IEEE.org [online], "This Car Runs on Code," Feb. 1, 2009, retrieved on Jul. 9, 2021, retrieved from URL<https://spectrum.ieee.org/transportation/systems/this-car-runs-on-code>, 5 pages.
Ingols et al., "Practical Attack Graph Generation for Network Defense," 2006 22nd Annual Computer Security Applications Conference (ACSAC'06), Miami Beach, Florida, Dec. 11-15, 2006, 10 pages.
International Organization for Standardization, "International Standard: ISO/IEC 27001," ISO/IEC 27001:2013(E), Oct. 1, 2013, 29 pages.
Jacobsen et al., "FAIR Principles: Interpretations and Implementation Considerations," Data Intelligence, Jan. 1, 2020, 2(1-2):10-29.
Joint Task Force Transformation Initiative, "Security and Privacy Controls for Federal Information Systems and Organizations," National Institute of Standards and Technology Special Publication 800-53, Revision 4, Jan. 22, 2015, 462 pages.
Kaloroumakis et al., "Toward a Knowledge Graph of Cybersecurity Countermeasures," Technical Report, The MITRE Corporation, 2021, 11 pages.
Khouzani et al., "Scalable min-max multi-objective cyber-security optimization over probabilistic attack graphs", European Journal of Operational Research, Nov. 1, 2019, 278(3):894-903.
Li et al., "Cluster security research involving the modeling of network exploitations using exploitation graphs," Proceedings of the IEEE International Symposium on Cluster Computing and the Grid, Singapore, May 16-19, 2006, 11 pages.
Lippmann et al., "Validating and restoring defense in depth using attack graphs," Proceedings of the Military Communications Conference, Washington, DC, USA, Oct. 23-25, 2006, 10 pages.
Lu et al., "Ranking attack graphs with graph neural networks," Proceedings of the 5th International Conference on Information Security Practice and Experience, Xi'an, China, Apr. 13-15, 2009; Lecture Notes in Computer Science, Apr. 2009, 5451:345-359.

(56) References Cited

OTHER PUBLICATIONS

Machado et al., "Data Mesh: Concepts and Principles of a Paradigm Shift in Data Architectures," Procedia Computer Science, 2022, 196:263-271.
Machado et al., "Data-Driven Information Systems: The Data Mesh Paradigm Shift," Presented at Proceedings of the 29th International Conference on Information Systems Development, Valencia, Spain, Sep. 8-10, 2021, 6 pages.
Makridakis, "The forthcoming artificial intelligence (ai) revolution: Its impact on society and firms," Futures, Jun. 2017, 90:46-60.
Manning Free Content Center [online], "Building Your Vocabulary," dated May 19, 2017, retrieved on Jun. 3, 2020, retrieved from URL <https://freecontent.manning.com/building-your-vocabulary/>, 10 pages.
Martins et al., "A framework for conceptual characterization of ontologies and its application in the cybersecurity domain," Software and Systems Modeling, Jul. 2, 2022, 21:1437-1464.
Martins et al., "Conceptual Characterization of Cybersecurity Ontologies," The Practice of Enterprise Modelling, Nov. 18, 2020, 323-338.
MaschinenMarkt.international [online], "Digital twin in the automobile industry," Aug. 1, 2019, retrieved on Jul. 9, 2021, retrieved from URL<https://www.maschinenmarkt.international/digital-twin-in-the-automobile-industry-a-851549/>, 3 pages.
Mashable.com [online], "Ford ready to innovate, but not at the expense of customer needs," May 31, 2016, retrieved on Jul. 9, 2021, retrieved from URL<https://mashable.com/article/mark-fields-ford-codecon>, 7 pages.
Mathis, "Data lakes," Datenbank-Spektrum, Oct. 6, 2017, 17(3):289-293.
Mehta et al., "Ranking attack graphs," Proceedings of the International Conference on Recent Advances in Intrusion Detection, Hamburg, Germany, Sep. 20-22, 2006; Lecture Notes in Computer Science, Sep. 2006, 4219:127-144.
Mitre.org [online], "CAPEC: Common Attack Pattern Enumerations and Classifications," available on or before Jul. 21, 2007 via Internet Archive: Wayback Machine URL<https://web.archive.org/web/20070721234158/https://capec.mitre.org/>, retrieved on Oct. 4, 2022, retrieved from URL<https://capec.mitre.org/>, 2 pages.
Mitre.org [online], "CWE: Common Weakness Enumeration," available on or before Oct. 9, 2006 via Internet Archive: Wayback Machine URL<https://web.archive.org/web/20061009060144/https://cwe.mitre.org/>, retrieved on Oct. 4, 2022, retrieved from URL<https://cwe.mitre.org/>, 1 page.
MITRE.org [online], "D3FEND," available on or before Jun. 22, 2021 via Internet Archive: Wayback Machine URL<https://web.archive.org/web/20210622142005/https://d3fend.mitre.org/>, retrieved on Jul. 13, 2022, retrieved from URL<https://d3fend.mitre.org/>, 3 pages.
MITRE.org [online], "Digital Artifact Ontology," available on or before Jun. 25, 2021 via Internet Archive: Wayback Machine URL<https://web.archive.org/web/20210625024718/https://d3fend.mitre.org/dao>, retrieved on Jul. 13, 2022, retrieved from URL<https://d3fend.mitre.org/dao/>, 3 pages.
MITRE.org [online], "Service Application," available on or before Jun. 25, 2021 via Internet Archive: Wayback Machine URL<https://web.archive.org/web/20210625024952/https://d3fend.mitre.org/dao/artifact/d3f:ServiceApplication/>, retrieved on Jul. 13, 2022, retrieved from URL<https://d3fend.mitre.org/dao/artifact/d3f:ServiceApplication/>, 1 page.
Monino, "Data Value, Big Data Analytics, and Decision-Making," Journal of the Knowledge Economy, Aug. 20, 2016, 256-267.
Murata, "Petri Nets: Properties, Analysis and Applications," Proceedings of the IEEE, Apr. 1989, 77(4):541-580.
Narmeen Zakaria Bawany; DDOS Attack Detection and Mitigation Using SON: Methods, Practices, and Solutions; Springer-2017; p. 425-441.
National Institute of Standards and Technology [online], "National Vulnerability Database," last updated Jun. 2, 2020, retrieved on Jun. 3, 2020, retrieved from URL<https://nvd.nist.gov/>, 4 pages.
Neo4j.com [online], "Random Walk," available on or before Aug. 6, 2020 via Internet Archive: Wayback Machine URL<https://web.archive.org/web/20200806193136/https://neo4j.com/docs/graph-data-science/current/alpha-algorithms/random-walk/>, retrieved on Jul. 28, 2021, retrieved from URL<https://neo4j.com/docs/graph-data-science/current/alpha-algorithms/random-walk/>, 7 pages.
Neo4j.com [online], "Topological link prediction," available on or before May 17, 2020, via Internet Archive: Wayback Machine URL<https://web.archive.org/web/20200517111258/https://neo4j.com/docs/graph-data-science/current/algorithms/linkprediction/>, retrieved on Jun. 14, 2022, retrieved from URL<https://neo4j.com/docs/graph-data-science/current/algorithms/linkprediction/>, 2 pages.
Neo4j.com [online], "Yen's K-Shortest Paths," available on or before Aug. 6, 2020 via Internet Archive: Wayback Machine URL<https://web.archive.org/web/20200806185626/https://neo4j.com/docs/graph-data-science/current/alpha-algorithms/yen-s-k-shortest-path/, retrieved on Jul. 28, 2021, retrieved from URL<https://web.archive.org/web/20200806185626/https://neo4j.com/docs/graph-data-science/current/alpha-algorithms/yen-s-k-shortest-path/>, 5 pages.
Networks: An Introduction, Newman (ed.), May 2010, 789 pages.
Noel et al., "CyGraph: Graph-Based Analytics and Visualization for Cybersecurity," Handbook of Statistics, Jan. 2016, 35:117-167.
Noel et al., "Managing attack graph complexity through visual hierarchical aggregation," Proceedings of the 2004 ACM Workshop on Visualization and Data Mining for Computer Security (VizSEC/DMSEC '04), Washington, DC, USA, Oct. 29, 2004, 10 pages.
Noel et al., "Understanding complex network attack graphs through clustered adjacency matrices," Proceedings of the 21st Annual Computer Security Applications Conference (ACSAC'05), Tucson, AZ, USA, Dec. 5-9, 2005, 10 pages.
Ortalo et al., "Experimenting with quantitative evaluation tools for monitoring operational security," IEEE Transactions on Software Engineering, Sep./Oct. 1999, 25(5):633-650.
Ou et al., "A Scalable Approach to Attack Graph Generation," Proceedings of the 13th ACM Conference on Computer and Communication Security, Oct. 2006, 336-345.
Ou et al., "MulVAL: A Logic-based Network Security Analyzer," 14th USENIX Security Symposium, Aug. 2005, Baltimore, MD, USA, 16 pages.
Phillips et al., "A graph-based system for network-vulnerability analysis," Proceedings of the 1998 Workshop on New Security Paradigms, Charlottesville, Virginia, Sep. 22-26, 1998, 71-79.
PM4Py.de [online], "DFG: Process Discovery using Directly-Follows Graphs," available on or before Mar. 7, 2019 via Internet Archive: Wayback Machine URL<https://web.archive.org/web/20190307062454/http://pm4py.pads.rwth-aachen.de/documentation/process-discovery/dfg/>, retrieved on Jul. 28, 2021, retrieved from URL<https://web.archive.org/web/20190307062454/http://pm4py.pads.rwth-aachen.de/documentation/process-discovery/dfg/>, 4 pages.
PM4Py.de [online], "Process Discovery," available on or before Jun. 26, 2020 via Internet Archive: Wayback Machine URL<https://web.archive.org/web/20200626094921/https://pm4py.fit.fraunhofer.de/documentation#discovery>, retrieved on Jul. 28, 2021, retrieved from URL<https://pm4py.fit.fraunhofer.de/documentation#discovery>, 5 pages.
Process Mining, 1st ed., van der Aalst, 2011, Chapters 5-6, 63 pages.
Purvine et al., "A Graph-Based Impact Metric for Mitigating Latheral Movement Cyber Attacks," Automated Descision Making for Active Cyber Defence, Oct. 2016, pp. 45-52.
Q. Liu et al., "Latte: Large-Scale Lateral Movement Detection," MILCOM 2018—2018 IEEE Military Communications Conference (MILCOM), 2018, pp. 1-6, doi: 10.1109/MILCOM.2018.8599748. (Year: 2018).
Rossi et al., "Knowledge Graph Embedding for Link Prediction: A Comparative Analysis," arXiv, Feb. 3, 2020, arXiv:2002.00819v1, 42 pages.
Sales et al., "Ontological anti-patterns in taxonomic structures," Presented at Proceedings of ONTOBRAS 2019: XII Seminar on Ontology Research in Brazil, Porto Alegre, Brazil, Sep. 2-5, 2019, 13 pages.
Schatz et al., "Economic valuation for information security investment: a systematic literature review," Information Systems Frontiers, Apr. 18, 2016, 19:1205-1228.

(56) References Cited

OTHER PUBLICATIONS

Shandilya et al., "Use of Attack Graphs in Security Systems", Hindawi Journal of Computer Networks and Communications, Oct. 20, 2014, 2014:818957, 14 pages.
Shi et al., "Normalized Cuts and Image Segmentation," IEEE Transactions on Pattern Analysis and Machine Intelligence, Aug. 2000, 22(8):888-905.
Siemens.com [online], "From vehicle design to multi-physical simulations," available on or before Jul. 26, 2019 via Internet Archive: Wayback Machine URL<https://web.archive.org/web/20190726044643/https://new.siemens.com/global/en/markets/automotive-manufacturing/digital-twin-product.html>, retrieved on Jul. 9, 2021, retrieved from URL<https://new.siemens.com/global/en/markets/automotive-manufacturing/digital-twin-product.html>, 11 pages.
Sitton-Candanedo et al., "A review of edge computing reference architectures and a new global edge proposal," Future Generation Computer Systems, Oct. 2019, 99:278-294.
SMMT.co.uk [online], "Role of Digital Twin in Automotive Industry," Dec. 17, 2018, retrieved on Jul. 9, 2021, retrieved from URL<https://www.smmt.co.uk/2018/12/role-of-digital-twin-in-automotive-industry/>, 9 pages.
Sourceforge.net [online], "XSB," last updated Oct. 29, 2017, retrieved on Jun. 3, 2020, retrieved from URL <http://xsb.sourceforge.net/>, 2 pages.
Stanek et al., "Method of comparing graph differencing algorithms for software differencing," 2008 IEEE International Conference on Electro/Information Technology, Ames, Iowa, May 18-20, 2008, 482-487.
Strom et al., "MITRE ATT&CK™: Design and Philosophy", The MITRE Corporation, Jul. 2018, 37 pages.
Swiler et al., "A graph-based network-vulnerability analysis system," Sandia National Laboratories, 1997, Tech. Rep. SAND97-3010/1, 25 pages.
Tan et al., "Future internet: The Internet of Things," Presented at Proceedings of the 2010 3rd International Conference on Advanced Computer Theory and Engineering (ICACTE), Chengdu, China, Aug. 20-22, 2010,.
TechCrunch.com [online], "Tesla is rolling out its Navigate on Autopilot feature," Oct. 27, 2018, retrieved on Jul. 9, 2021, retrieved from URL<https://techcrunch.com/2018/10/26/tesla-is-rolling-out-its-navigate-on-autopilot-feature/>, 17 pages.
The Fourth Industrial Revolution, 1st. ed., Schwab, Jan. 2017, 218 pages.
The MITRE Corporation [online], "MITRE ATT&CK," last updated May 27, 2020, retrieved on Jun. 3, 2020, retrieved from URL <https://attack.mitre.org/>, 3 pages.
Ullah et al., "Towards Modeling Attacker's Opportunity for Improving Cyber Resilience in Energy Delivery Systems", Resilience Week, Aug. 2018, pp. 100-107.
Uschold et al., "Ontologies: Principles, methods and applications," The Knowledge Engineering Review, Jan. 1996, 11(2):93-136.
Van Der Aalst et al., "Causal Nets: A Modeling Language Tailored towards Process Discovery," Presented at Proceedings of CONCUR 2011—Concurrency Theory, Aachen, Germany, Sep. 6-9, 2011; Lecture Notes in Computer Science, Sep. 2011, 6901:28-42.
Van Heijst et al., "Using explicit ontologies in KBS development," International Journal of Human-Computer Studies, Feb. 1997, 46(2-3):183-292.
Vehicle Power Management, 1st ed., Zhang et al (eds.), Aug. 2011, Chapter 10, 27 pages.
W3.org [online], "SWRL: A Semantic Web Rule Language Combining OWL and RuleML," May 21, 2004, retrieved on Oct. 4, 2022, retrieved from URL<https://www.w3.org/Submission/SWRL/>, 24 pages.
Wand et al., "On the deep structure of information systems," Information Systems Journal, Jul. 1995, 5(3):203-223.
Wang et al., "A Network Vulnerability Assessment Method Based on Attack Graph," 2018 IEEE 4th International Conference on Computer and Communications, Dec. 7-10, 2018, Chengdu, China, 1149-1154.
Wang et al., "Big data analytics in cyber security: network traffic and attacks," Journal of Computer Information Systems, Jan. 2020, 61(3):1-8.
Wang et al., "Exploring Attack Graph for Cost-benefit Security Hardening: A Probabilistic Approach," Computers & Security, Feb. 2013, 32:158-169.
Ward et al., "Threat Analysis and Risk Assessment in Automotive Cyber Security," SAE Int. J. Passeng. Cars Electron. Electr. Systems, May 2013, 6(2):507-513.
Wikipedia.org [online], "5G," last updated Jul. 9, 2021, retrieved on Jul. 9, 2021, retrieved from URL<https://en.wikipedia.org/wiki/5G>, 29 pages.
Wikipedia.org [online], "Active Directory," last updated Jun. 1, 2020, retrieved on Jun. 3, 2020, retrieved from URL <https://en.wikipedia.org/wiki/Active_Directory>, 14 pages.
Wikipedia.org [online], "Backward Chaining," last updated Nov. 16, 2019, retrieved on Jun. 3, 2020, retrieved from URL <https://en.wikipedia.org/wiki/Backward_chaining>, 3 pages.
Wikipedia.org [online], "Breadth-first search," last updated Jul. 21, 2021, retrieved on Jul. 28, 2021, retrieved from URL<https://en.wikipedia.org/wiki/Breadth-first_search>, 6 pages.
Wikipedia.org [online], "Cartesian Product," last updated Feb. 28, 2020, retrieved on Jun. 3, 2020, retrieved from URL <https://en.wikipedia.org/wiki/Cartesian_product>, 9 pages.
Wikipedia.org [online], "Centrality," last updated May 29, 2020, retrieved on Jun. 3, 2020, retrieved from URL <https://en.wikipedia.org/wiki/Centrality>, 15 pages.
Wikipedia.org [online], "Centrality," last updated Oct. 18, 2020, retrieved on Oct. 26, 2020, retrieved from URL<https://en.wikipedia.org/wiki/Centrality>, 15 pages.
Wikipedia.org [online], "Common Vulnerabilities and Exposures," last updated Jul. 6, 2021, retrieved on Jul. 9, 2021, retrieved from URL<https://en.wikipedia.org/wiki/Common_Vulnerabilities_and_Exposures>, 5 pages.
Wikipedia.org [online], "Common Vulnerability Scoring System," last updated Jun. 21, 2021, retrieved on Jul. 9, 2021, retrieved from URL<https://en.wikipedia.org/wiki/Common_Vulnerability_Scoring_System>, 7 pages.
Wikipedia.org [online], "Depth-first search," last updated Jun. 16, 2021, retrieved on Jul. 28, 2021, retrieved from URL<https://en.wikipedia.org/wiki/Depth-first_search>, 8 pages.
Wikipedia.org [online], "Digital twin," last updated Jul. 8, 2021, retrieved on Jul. 9, 2021, retrieved from URL<https://en.wikipedia.org/wiki/Digital_twin>, 13 pages.
Wikipedia.org [online], "Eigenvector centrality," last updated Dec. 1, 2020 retrieved on Jan. 11, 2021, retrieved from URL<https://en.wikipedia.org/wiki/Eigenvector_centrality>, 4 pages.
Wikipedia.org [online], "Flood Fill," last updated Dec. 24, 2019, retrieved on Jun. 3, 2020, retrieved from URL <https://en.wikipedia.org/wiki/Flood_fill>, 7 pages.
Wikipedia.org [online], "Floyd-Warshall algorithm," last updated Jan. 5, 2021, retrieved on Jan. 11, 2021, retrieved from URL<https://en.wikipedia.org/wiki/Floyd%E2%80%93Warshall_algorithm>, 7 pages.
Wikipedia.org [online], "Forward Chaining," last updated Nov. 18, 2019, retrieved on Jun. 3, 2020, retrieved from URL <https://en.wikipedia.org/wiki/Forward_chaining>, 3 pages.
Wikipedia.org [online], "Look-ahead (backtracking)," last updated May 23, 2020, retrieved on Jun. 3, 2020, retrieved from URL <https://en.wikipedia.org/wiki/Look-ahead_(backtracking)>, 3 pages.
Wikipedia.org [online], "Natural language processing," last updated Jun. 10, 2022, retrieved on Jun. 14, 2022, retrieved from URL<https://en.wikipedia.org/wiki/Natural_language_processing>, 13 pages.
Wikipedia.org [online], "Reachability," last updated Oct. 22, 2021, retrieved on Jul. 13, 2022, retrieved from URL<https://en.wikipedia.org/wiki/Reachability>, 5 pages.
Wikipedia.org [online], "SCADA," last updated Jun. 2, 2020, retrieved on Jun. 3, 2020, retrieved from URL <https://en.wikipedia.org/wiki/SCADA>, 12 pages.

(56) References Cited

OTHER PUBLICATIONS

Wikipedia.org [online], "Sigmoid function," last updated Dec. 25, 2020, retrieved on Jan. 11, 2021, retrieved from URL<https://en.wikipedia.org/wiki/Sigmoid_function>, 4 pages.
Wikipedia.org [online], "SWOT analysis," last updated Oct. 20, 2020, retrieved on Oct. 26, 2020, retrieved from URL<https://en.wikipedia.org/wiki/SWOT_analysis>, 8 pages.
Wikipedia.org [online], "Traffic congestion," last updated Oct. 5, 2020, retrieved on Oct. 26, 2020, retrieved from URL<https://en.wikipedia.org/wiki/Traffic_congestion>, 24 pages.
Wikipedia.org [online], "Traffic flow," last updated Oct. 19, 2020, retrieved on Oct. 26, 2020, retrieved from URL<https://en.wikipedia.org/wiki/Traffic_flow>, 41 pages.
Wikipedia.org [online], "Zero-day (computing)," last updated Oct. 16, 2020, retrieved on Oct. 26, 2020, retrieved from URL<https://en.wikipedia.org/wiki/Zero-day_(computing)>, 8 pages.
Williams et al., "An Interactive Attack Graph Cascade and Reachability Display," Proceedings of the Workshop on Visualization for Computer Security (VizSEC 2007), Sacramento, CA, USA, Oct. 29, 2007, 17 pages.
Wu et al., "A service-oriented architecture for business intelligence," Presented at Proceedings of the IEEE International Conference on Service-Oriented Computing and Applications (SOCA '07), Newport Beach, CA, USA, Jun. 19-20, 2007, 279-285.
X. Li, C. Zhang, T. Jung, J. Qian and L. Chen, "Graph-based privacy-preserving data publication," IEEE INFOCOM 2016—The 35th Annual IEEE International Conference on Computer Communications, 2016, pp. 1-9, doi: 10.1109/INF000M.2016.7524584. (Year: 2016).
Xie et al., "Using Bayesian Networks for Cyber Security Analysis," Proceedings of the 2010 IEEE/IFIP International Conference on Dependable Systems & Networks, Jun. 28-Jul. 1, 2010, Chicago, Illinois, 211-220.
Yi et al., "Overview on attack graph generation and visualization technology," 2013 International Conference on Anti-Counterfeiting, Security and Identification (ASID), Shanghai, China, Oct. 25-27, 2013, 6 pages.
You et al., "A Review of Cyber Security Controls from An ICS Perspective," Proceedings of 2018 International Conference on Platform Technology and Service (PlatCon), Jan. 29-31, 2018, Jeju, South Korea, 5 pages.
Yousefi et al., "A novel approach for analysis of attack graph," Proceedings of the 2017 IEEE International Conference on Intelligence and Security Informatics (ISI), Beijing, China, Jul. 22-24, 2017, 6 pages.
Zeng et al., "Survey of Attack Graph Analysis Methods from the Perspective of Data and Knowledge Processing," Hindawi Security and Communication Networks, Dec. 26, 2019, 2019:2031063, 17 pages.
Zhang et al., "Co-simulation framework for design of time-triggered cyber physical systems," 2013 ACM/IEEE International Conference on Cyber-Physical Systems (ICCPS), Philadelphia, Pennsylvania, Apr. 8-11, 2013, 119-128.
Zhang et al., "Optimal Decision-Making Approach for Cyber Security Defense Using Game Theory and Intelligent Learning," Security and Communication Networks, Dec. 23, 2019, 2019:3038586, 17 pages.
Zhao et al., "Attack graph analysis method for large scale network security hardening," J. Front. Comput. Sci. Technology, 2018, 12(2):263-273 (with English Abstract).
Zhou et al., "Automatically Correcting Networks with NEAt," Proceedings of the 15th USENIX Symposium on Networked Systems Design and Implementation (NSDI '18), Renton, WA, USA, Apr. 9-11, 2018, 595-608.

\* cited by examiner

ANALYTICAL ATTACK GRAPH ABSTRACTION FOR RESOURCE-EFFICIENCIES

CROSS-REFERENCE TO RELATED APPLICATIONS

This application claims priority to U.S. 63/343,136 filed on May 18, 2022, the disclosure of which is expressly incorporated herein by reference in the entirety.

BACKGROUND

Computer networks are susceptible to attack by malicious users (e.g., hackers). For example, hackers can infiltrate computer networks in an effort to obtain sensitive information (e.g., user credentials, payment information, address information, social security numbers) and/or to take over control of one or more systems. To defend against such attacks, enterprises use security systems to monitor occurrences of potentially adverse events occurring within a network, and alert security personnel to such occurrences. For example, one or more dashboards can be provided, which provide lists of alerts that are to be addressed by the security personnel.

Modern computer networks are largely segregated and often deployed with diverse cyber defense mechanisms, which makes it challenging for an attacker (hacker) to gain direct access to a target (e.g., administrator credentials). This pattern is commonly seen in industrial control systems (ICSs) where a layered architecture ensures that targets are not in close proximity to the perimeter. Despite the presence of a layered architecture, the spate of attacks is increasing rapidly and span from large enterprises to critical infrastructure (CINF) networks. Due to the potential severe damage and cost experienced by a victim, CINFs have been intentionally targeted and have suffered from significant losses when successfully exploited.

In an effort to defend against cyber-attacks, so-called analytical attack graphs (AAGs) can be generated, which represent potential lateral movements of adversaries within computer networks. An AAG includes logical rule nodes, fact nodes, and derived fact nodes. The AAG provides a graph-based representation that describes ways by which an attacker can achieve progress towards a desired goal.

Given an AAG, different types of analyses can be performed to identify paths to reach a target goal, measure the hackability of the network, and gain insights on how to make the network more secure. Accordingly, AAGs can be described as an important tool in developing anti-hacker defenses. For example, an AAG can be used to identify the most vulnerable components within a computer network and can be used to evaluate fixes of vulnerabilities that the AAG reveals (e.g., by fixing a limited number of issues, any adversary attack on the computer network, or on certain components in the computer network can be stopped). In this way, an AAG can be used to understand how a computer network can be hacked and undesirable consequences that can result.

By definition, AAGs are graph data structures that are processed using computing resources (e.g., processors, memory). Graph processing presents technical challenges in that it is resource-intensive. For example, AAGs are relatively large in size, particularly for large, complex enterprise networks, which requires significant memory and processing power for graph processing of an AAG. This is complicated by the fact that, in cyber-security, AAGs are frequently generated and processed for cyber-security analytics to keep up with the dynamics of enterprise networks. Resource-intensive graph processing presents other technical challenges, such as hindering scalability.

SUMMARY

Implementations of the present disclosure are directed to analytical attack graphs (AAGs) for enterprise-wide cyber-security. More particularly, implementations of the present disclosure are directed to providing abstract AAGs from AAGs. As described in further detail herein, abstract AAGs preserve the structure of and paths within their respective initial (concrete) AAGs. The disclosed techniques can be used to compute a defense core. In some examples, a defense core is a locally minimal subset of the AAG's rules whose removal will prevent an attacker from reaching a crown jewel. In order to scale-up the performance of the detection of a defense core, bisimulation approaches are applied to AAGs.

In some examples, implementations of the present disclosure are provided within an agile security platform that determines asset vulnerability of enterprise-wide assets including cyber-intelligence and discovery aspects of enterprise information technology (IT) systems and operational technology (OT) systems, asset value, potential for asset breach and criticality of attack paths towards target(s) including hacking analytics of enterprise IT/OT systems.

In some implementations, actions include processing an AAG using bisimulation to provide an abstract AAG, the abstract AAG including at least one abstract node representing a plurality of nodes of the AAG and at least one abstract edge representing a plurality of edges of the AAG. Other implementations of this aspect include corresponding systems, apparatus, and computer programs, configured to perform the actions of the methods, encoded on computer storage devices. The use of bisimulation results in significantly smaller graphs and in faster detection of defense cores, improving security of cybersecurity networks. Defense minimality is important because system changes corresponding to logical rule change or removal may be expensive or technically difficult to apply. Typically, many different defense cores may exist and computing the minimal one is computationally expensive. To improve efficiency, a locally minimal subset is computed, which may be larger than other possible defense cores but does not include any redundant rules.

In some implementations, actions include: receiving an initial analytic attack graph (AAG) that is representative of paths within the enterprise network with respect to at least one target asset, the initial AAG comprising nodes and edges between the nodes; identifying, from the nodes of the initial AAG, a plurality of node groups, each node group including two or more nodes having at least one common attribute; generating an abstract AAG from the initial AAG, the abstract AAG including at least one abstract node, wherein each node group of the initial AAG is represented by a respective abstract node of the abstract AAG; determining a set of remedial actions at least partially based on the abstract AAG; and executing one or more remedial actions in the set of remedial actions to reduce a cyber security risk to the enterprise network.

Other implementations of this aspect include corresponding systems, apparatus, and computer programs, configured to perform the actions of the methods, encoded on computer storage devices.

These and other implementations can each optionally include one or more of the following features: each node comprises one of a rule node, a fact node, or a derived fact node; attributes of nodes comprise labels, arguments, and types; the node groups of the initial AAG each include two or more nodes having a common label and type; each abstract node in the abstract AAG is associated with the common label and type of the respective node group of the initial AAG; the actions include storing, in a database, mapping data between an abstract node of the abstract AAG and the nodes of the respective node group of the initial AAG represented by the abstract node; determining the set of remedial actions at least partially based on the abstract AAG comprises processing the abstract AAG with a cyber defense algorithm to identify a set of rule nodes to be removed from the initial AAG; processing the abstract AAG with a cyber defense algorithm to identify a set of rule nodes to be removed from the initial AAG comprises: determining, using the cyber defense algorithm, at least one abstract rule node to be removed from the abstract AAG; and identifying the set of rule nodes to be removed from the initial AAG by mapping the at least one abstract rule node of the abstract AAG to rule nodes of the initial AAG using stored the mapping data; the set of rule nodes comprises a locally minimal set of rules of which removal prevents all attacks to the at least one target asset; executing the one or more remedial actions in the set of remedial actions to reduce the cyber security risk to the enterprise network comprises removing rule nodes of the identified set of rule nodes from the initial AAG; the abstract AAG includes at least one abstract edge between two abstract nodes; the actions include storing, in a database, mapping data between an abstract edge of the abstract AAG and respective nodes of the initial AAG represented by the abstract nodes connected by the abstract edge; identifying the plurality of node groups in the initial AAG, each node group including two or more nodes having a common attribute comprises: searching the initial AAG for bisimular nodes, wherein each node group comprises two or more bisimular nodes; bisimular nodes have a common label and type.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
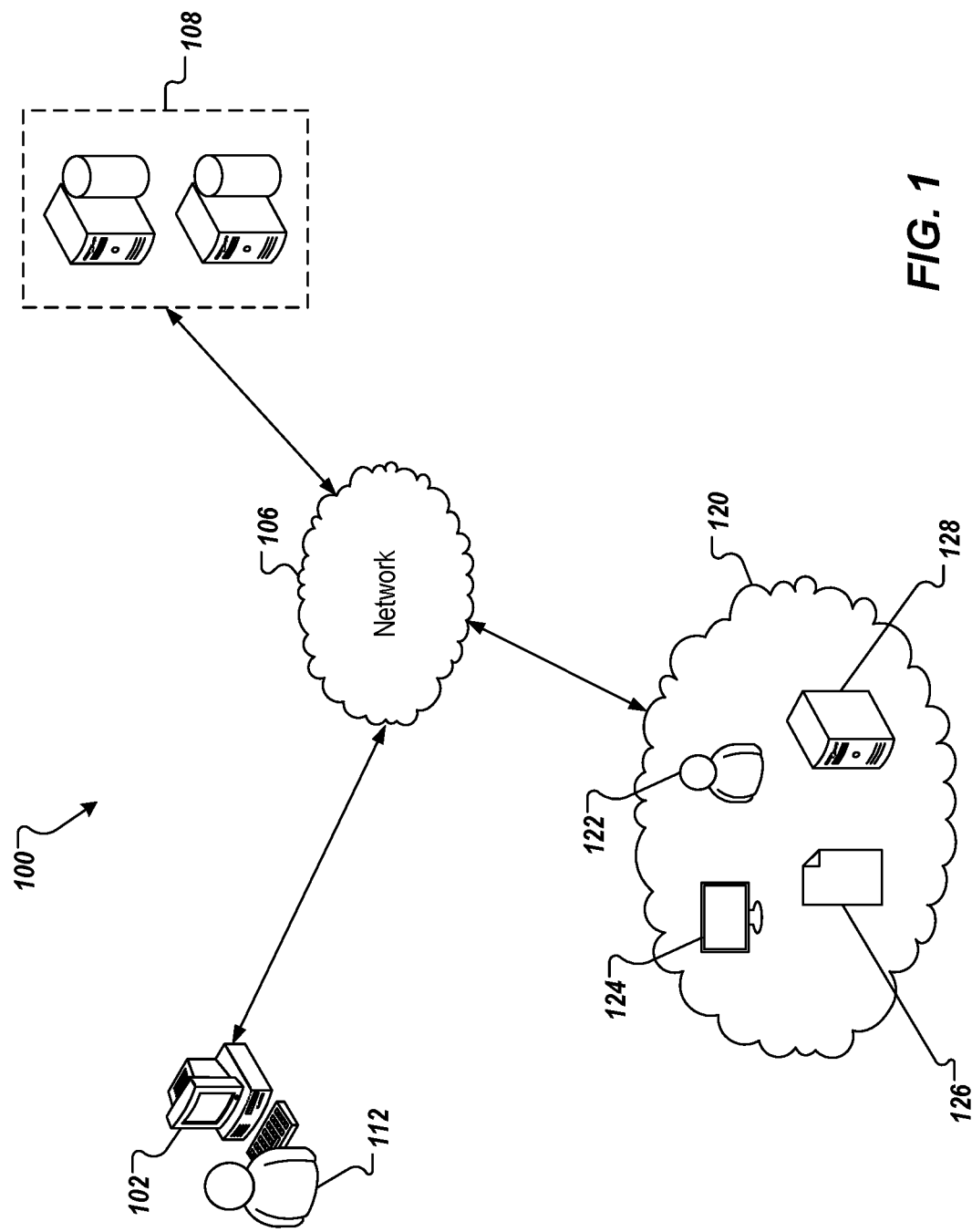
FIG. 1 depicts an example architecture that can be used to execute implementations of the present disclosure.

Implementations of the present disclosure are directed to analytical attack graphs (AAGs) for enterprise-wide cyber-security. More particularly, implementations of the present disclosure are directed to providing abstract AAGs from AAGs. As described in further detail herein, abstract AAGs preserve the structure of and paths within their respective initial (concrete) AAGs. An AAG includes logical rule nodes, fact nodes, and derived fact nodes. The AAG provides a graph-based representation that describes ways by which an attacker can achieve progress towards a desired goal. Given an AAG, different types of analyses can be performed to identify paths to reach a target goal, measure the hackability of the network, and gain insights on how to make the network more secure.

Processes for AAG abstraction can be used to collapse groups of similar nodes together and yield a model that may be an order of magnitude smaller than the original AAG. An abstract AAG is an AAG that represents a larger concrete AAG and is reduced in size compared to the concrete AAG. An abstract AAG can be generated from a concrete AAG by processes of abstraction, which can be referred to as collapsing or folding. The abstract AAG maintains the topology of the original graph. This ensures that the abstract AAG is a compact yet accurate representation of the concrete AAG, and thus different analytics can be performed over the abstract AAG.

This enables one to reason over the abstract graph, rather than over a filtered version of the original graph. By doing so, removal of graph elements all together is avoided, and a more reliable approach to scale up the analysis is obtained.

In some examples, implementations of the present disclosure are provided within an agile security platform that determines asset vulnerability of enterprise-wide assets including cyber-intelligence and discovery aspects of enterprise information technology (IT) systems and operational technology (OT) systems, asset value, potential for asset breach and criticality of attack paths towards target(s) including hacking analytics of enterprise IT/OT systems.

In some implementations, actions include receiving data representative of two or more AAGs, providing an identifier for each element of each of the two or more AAGs, each identifier being unique within a respective AAG, at least one identifier being non-unique between the two or more AAGs, determining an attribute value for each element of each of the two or more AAGs, storing attribute value to element mappings in an attribute dictionary, providing a differenced AAG based on the attribute value to element mappings in the attribute dictionary, determining a set of remedial actions at least partially based on the differenced AAG, and executing one or more remedial actions in the set of remedial actions to reduce a cyber security risk to the enterprise network.

To provide context for implementations of the present disclosure, and as introduced above, modern computer networks are largely segregated and often deployed with diverse cyber defense mechanisms, which makes it challenging for an attacker (hacker) to gain direct access to a target (e.g., administrator credentials). This pattern is commonly seen in industrial control system (ICSs) where a layered architecture ensures that targets are not in close proximity to the perimeter. Despite the presence of a layered architecture, the spate of attacks is increasing rapidly and span from large enterprises to the critical infrastructure (CINF) networks. Due to the potential severe damage and cost experienced by a victim nation, CINF networks have been targeted intentionally and have suffered from significant losses when successfully exploited.

In general, attacks on CINF networks occur in multiple stages. Consequently, detecting a single intrusion does not necessarily indicate the end of the attack as the attack could have progressed far deeper into the network. Accordingly, individual attack footprints are insignificant in an isolated manner, because each is usually part of a more complex multi-step attack. That is, it takes a sequence of steps to form an attack path toward a target in the network. Researchers have investigated several attack path analysis methods for identifying attacker's required effort (e.g., number of paths to a target and the cost and time required to compromise each path) to diligently estimate risk levels. However, traditional techniques fail to consider important features and provide incomplete solutions for addressing real attack scenarios. For example, some traditional techniques only consider the topological connection between stepping stones to measure the difficulty of reaching a target. As another example, some traditional techniques only assume some predefined attacker skill set to estimate the path complexity. In reality, an attacker's capabilities and knowledge of the enterprise network evolve along attack paths to the target.

In an effort to defend against cyber-attacks, AAGs can be generated, which represent potential lateral movements of adversaries within computer networks. An AAG can be used to understand how a computer network can be hacked and undesirable consequences that can result. Accordingly, AAGs can be described as an important tool in developing anti-hacker defenses. For example, an AAG can be used to identify the most vulnerable components within a computer network, and can be used to evaluate fixes of vulnerabilities that the AAG reveals (e.g., by fixing a limited number of issues, any adversary attack on the computer network, or on certain components in the computer network can be stopped).

By definition, AAGs structure data as a graph that includes vertices (nodes) and edges between vertices, a vertex representing an entity and an edge representing a relationship between entities. Consequently, graph processing has gained relevance in the fields of non-relational databases and analytics platforms. Graph processing can include performance problems on traditional hardware (e.g., central processing units (CPUs), graphics processing units (GPUs)), which can result from irregular memory accesses and computational intensity inherent in graph processing. That is, graph processing presents technical challenges in that it is resource-intensive. For example, AAGs are relatively large in size, particularly for large, complex enterprise networks, which requires significant memory and processing power for graph processing of an AAG. This is complicated by the fact that, in cyber-security, AAGs are frequently generated and processed for cyber-security analytics to keep up with the dynamics of enterprise networks. Resource-intensive graph processing presents other technical challenges, such as hindering scalability.

In view of the above context, implementations of the present disclosure are directed to abstraction of AAGs to provide abstract AAGs. The abstract AAG provides a simplified representation of an enterprise network while preserving the structural representations of and paths in the enterprise network. The abstract AAG requires a significantly smaller memory footprint than the AAG, thereby conserving technical resources, while enabling analytics to be performed with relatively low time complexity (e.g., linear time complexity).

In some examples, AAG abstraction of the present disclosure can be realized within an agile security platform that considers attack complexity within an interconnected cyber infrastructure with a variety of attack paths to comprehensively address real attack scenarios. It is contemplated, however, that AAG abstraction of the present disclosure can be realized in any appropriate cyber-security platform.

In general, the agile security platform provides a cyber-threat analysis framework based on characterizing adversarial behavior in a multi-stage cyber-attack process. As described in further detail herein, how a threat proceeds within a network is investigated using an AAG and all possible attack stages are identified. In some implementations, each stage can be associated with network attributes. Using a holistic view of threat exposure provided by AAGs, attack techniques and tactics are incorporated into stepping stones found in AAGs.

In further detail, the cyber-threat analysis framework adds context to each attack stage using a real-world knowledge base of adversary tactics and techniques to more comprehensively characterize progression along the attack path. In some implementations, an attack path analysis model identifies a level of difficulty in taking a path by considering the complexity of the path, the skill set of the attacker, and the like. Implementations of the present disclosure provide a path hardness that is measured in terms of a capability of the attacker and challenges. The insight into the level of difficulty of an attack path in the network helps security administrators to pinpoint critical paths and prioritize path hardening actions.

As described herein, the agile security platform enables continuous cyber- and enterprise-operations alignment controlled by risk management. The agile security platform improves decision-making by helping enterprises to prioritize security actions that are most critical to their operations. In some examples, the agile security platform combines methodologies from agile software development lifecycle, IT management, development operations (DevOps), and analytics that use artificial intelligence (AI). In some examples, agile security automation bots continuously analyze attack probability, predict impact, and recommend prioritized actions for cyber risk reduction. In this manner, the agile security platform enables enterprises to increase operational efficiency and availability, maximize existing cyber-security resources, reduce additional cyber-security costs, and grow organizational cyber resilience.

As described in further detail herein, the agile security platform provides for discovery of IT/OT supporting elements within an enterprise, which elements can be referred to as configuration items (CI). Further, the agile security platform can determine how these CIs are connected to provide a CI network topology. In some examples, the CIs are mapped to processes and services of the enterprise, to determine which CIs support which services, and at what stage of an operations process. In this manner, a services CI topology is provided.

In some implementations, the specific vulnerabilities and improper configurations of each CI are determined and enable a list of risks to be mapped to the specific IT/OT network of the enterprise. Further, the agile security platform of the present disclosure can determine what a malicious user (hacker) could do within the enterprise network, and whether the malicious user can leverage additional elements in the network such as scripts, CI configurations, and the like. Accordingly, the agile security platform enables analysis of the ability of a malicious user to move inside the network, namely, lateral movement within the network. This includes, for example, how a malicious user could move from one CI to another CI, what CI (logical or physical) can be damaged, and, consequently, damage to a respective service provided by the enterprise.

FIG. 1 depicts an example architecture 100 in accordance with implementations of the present disclosure. In the depicted example, the example architecture 100 includes a client device 102, a network 106, and a server system 108. The server system 108 includes one or more server devices and databases (e.g., processors, memory). In the depicted example, a user 112 interacts with the client device 102.

In some examples, the client device 102 can communicate with the server system 108 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 108 includes at least one server and at least one data store. In the example of FIG. 1, the server system 108 is intended to represent various forms of servers including, but not limited to a web server, an application server, a proxy server, a network server, and/or a server pool. In general, server systems accept requests for application services and provides such services to any number of client devices (e.g., the client device 102 over the network 106). In accordance with implementations of the present disclosure, and as noted above, the server system 108 can host an agile security platform.

In the example of FIG. 1, an enterprise network 120 is depicted. The enterprise network 120 represents a network implemented by an enterprise to perform its operations. In some examples, the enterprise network 120 represents on-premise systems (e.g., local and/or distributed), cloud-based systems, and/or combinations thereof. In some examples, the enterprise network 120 includes IT systems and OT systems. In general, IT systems include hardware (e.g., computing devices, servers, computers, mobile devices) and software used to store, retrieve, transmit, and/or manipulate data within the enterprise network 120. In general, OT systems include hardware and software used to monitor and detect or cause changes in processes within the enterprise network 120 as well as store, retrieve, transmit, and/or manipulate data. In some examples, the enterprise network 120 includes multiple assets. Example assets include, without limitation, users 122, computing devices 124, electronic documents 126, and servers 128.

In some implementations, the agile security platform is hosted within the server system 108, and monitors and acts on the enterprise network 120, as described herein. More particularly, and as described in further detail herein, one or more AAGs representative of the enterprise network are generated in accordance with implementations of the present disclosure. For example, the agile security platform detects IT/OT assets and generates an asset inventory and network maps, as well as processing network information to discover vulnerabilities in the enterprise network 120. The agile security platform executes AAG differencing of the present disclosure based on the network information.

In some examples, the agile security platform provides one or more dashboards, alerts, notifications and the like to cyber-security personnel that enable the cyber-security personnel to react to and remediate security relevant events. For example, the user 112 can include a cyber-security expert that views and responds to dashboards, alerts, and/or notifications of the agile security platform using the client device 102.

In some examples, the agile security platform operates over multiple phases. Example phases include an asset discovery, anomaly detection, and vulnerability analysis phase, a cyber resilience risk analysis phase, and a cyber resilience risk recommendation phase.

With regard to the asset discovery, anomaly detection, and vulnerability analysis phase, discovering what vulnerabilities exit across the vertical stack and the relevant use cases is imperative to be conducted from the enterprise IT to the control systems. A focus of this phase is to generate the security backlog of issues, and potential remediations.

Rather than managing each technology layer separately, the agile security platform addresses lateral movements across the stack. Through devices, communication channels (e.g., email, TCP/IP), and/or operation systems, vulnerabilities are addressed within the context of a service (e.g., a service that the enterprise offers to customers), and a cyber kill chain to a target in the operation vertical, generating operation disturbance by manipulation of data. The notion of a CI assists in mapping dependencies between IT/OT elements within a configuration management DB (CMDB). A so-called security CI (SCI) maps historical security issues of a certain managed security element and is mapped into a security aspect of a digital twin.

As a result, a stack of technologies is defined, and is configured in a plug-in reference architecture (replaceable and extensible) manner. The stack addresses different aspects of monitoring, harvesting, and alerting of information within different aggregations views (dashboards) segmented according to owners and relevant IT and security users. An example view includes a health metric inserted within the dashboard of an enterprise application. In some examples, the health metric indicates the security condition of the underlying service and hence, the reliability of the provided data and information. Similar to risks that can be driven by labor, inventory, or energy, security risk concern can be presented and evaluated in the operations-level, drilled-through for additional transparency of the issue, and can be optimally remediated by allocating investments to automation or to security and IT personal with adequate operations awareness.

With regard to the cyber resilience risk analysis phase, each vulnerability may have several remediations, and each has a cost associated with it, either per internal personnel time, transaction, service, or retainer, as well as the deferred cost of not acting on the issue. A focus of this phase is to enable economical decision-making of security investments, either to be conducted by the IT and security team or directly by automation, and according to risk mitigation budget.

In further detail, observing a single-issue type and its remediations does not reflect the prioritization between multiple vulnerabilities. Traditional systems are based on global risk assessment, yet the context in which the SCI is part of is missing. The overall risk of a process matters differently for each enterprise. As such, remediation would occur according to gradual hardening of a process according to prioritization, driven in importance and responsibility by the enterprise, not by gradual hardening of all devices, for example, in the organization according to policy, without understanding of the impact on separated operational processes. Hardening of a system should be a decision of the enterprise to drive security alignment with the enterprise.

In addition, as the system is changed by gradual enforcement and hardening, new issues are detected and monitored. Hence, making a big bang decision may be not relevant to rising risks as they evolve. Prioritization according to value is the essence of this phase. It is a matter of what is important for the next immediate term, according to overall goals, yet considering changes to the environment.

With regard to the cyber resilience risk recommendation phase, a focus is to simplify approved changes and actions by proactive automation. In traditional systems, the action of IT remediation of security issues is either done by the security team (such as awareness and training), by creating a ticket in the IT service system (call for patch managements), and/or by tools that are triggered by security and monitored by IT (automatic deployment of security policies, change of authentication and authorization, self-service access control management, etc.). Some operations can be conducted in a disconnected mode, such as upgrading firmware on an IoT device, in which the operator needs to access the device directly. Either automated or manual, by IT or by security, or by internal or external teams, the entire changes are constantly assessed by the first phase of discovery phase, and re-projected as a metric in a context. Progress tracking of these changes should also occur in a gradual manner, indicating maintenance scheduling on similar operational processes, hence, driving recommendations for frequent actions that can be automated, and serve as candidates to self-managed by the operations owners and systems users.

In the agile security platform, acting is more than automating complex event processing (CEP) rules on alerts captured in the system logs and similar tools. Acting is started in areas highlighted according to known patterns and changing risks. Pattern detection and classification of events for approved automation processes (allocated transactions budget), are aimed at commoditization of security hardening actions in order to reduce the attention needed for prioritization. As such, a compound backlog and decision phase, can focus further on things that cannot be automated versus those that can. All issues not attended yet are highlighted, those that are handled by automation are indicated as such, and monitored to completion, with a potential additional value of increasing prioritization due to changing risks impact analysis.

Figure 2:
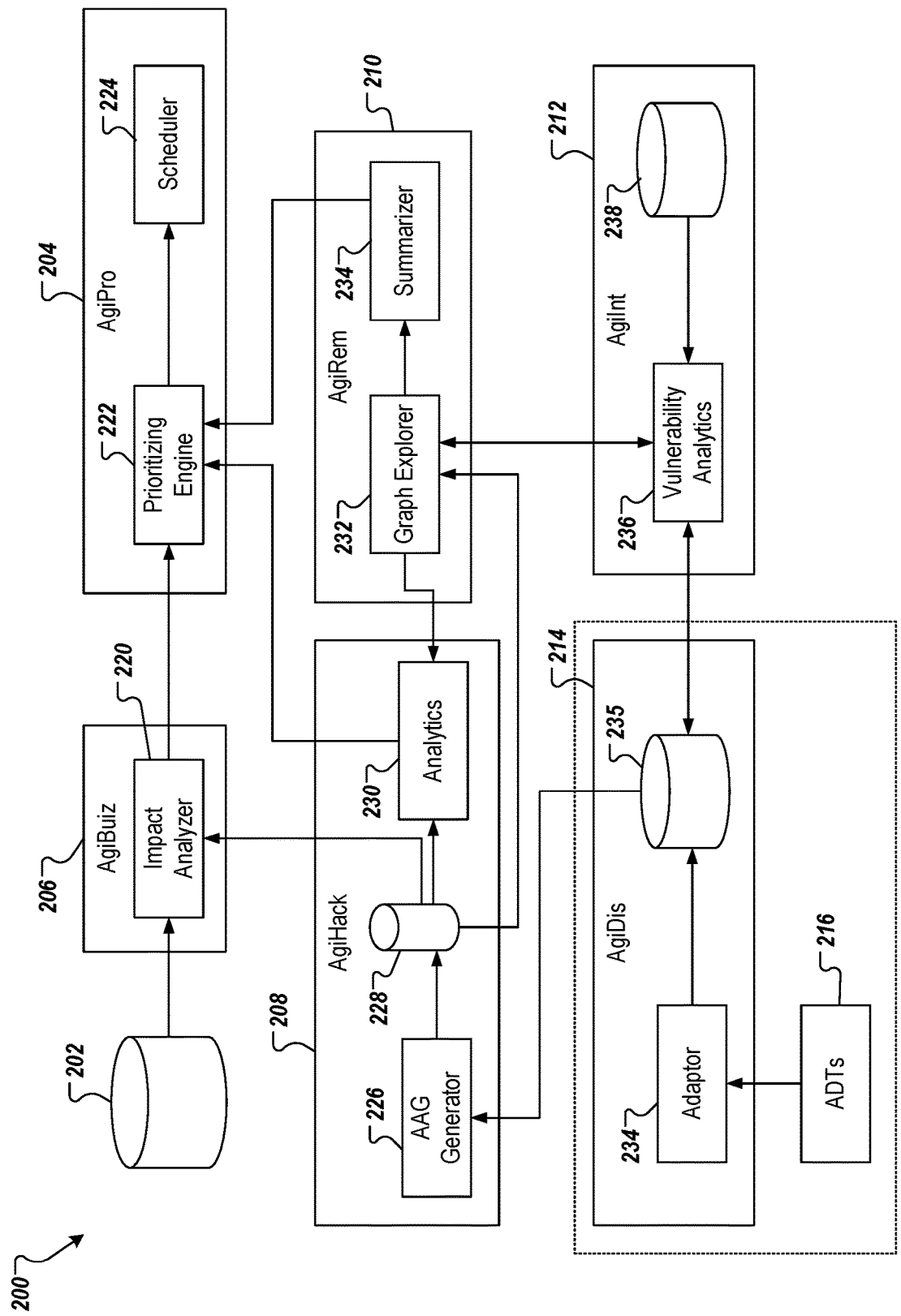
FIG. 2 depicts an example conceptual architecture of an agile security platform.

FIG. 2 depicts an example conceptual architecture 200 of an agile security (AgiSec) platform. The conceptual architecture 200 depicts a set of security services of the AgiSec platform, which include: an agile security prioritization (AgiPro) service 204, an agile security business impact (AgiBuiz) service 206, an agile security remediation (AgiRem) service 210, an agile security hacker lateral movement (AgiHack) service 208, an agile security intelligence (AgiInt) service 212, and an agile security discovery (AgiDis) service 214. The conceptual architecture 200 also includes an operations knowledge base 202 that stores historical data provided for an enterprise network (e.g., the enterprise network 120).

In the example of FIG. 2, the AgiDis service 214 includes an adaptor 234, and an asset/vulnerabilities knowledge base 235. In some examples, the adaptor 234 is specific to an asset discovery tool (ADT) 216. Although a single ADT 216 is depicted, multiple ADTs can be provided, each ADT being specific to an IT/OT site within the enterprise network. Because each adaptor 234 is specific to an ADT 216, multiple adaptors 234 are provided in the case of multiple ADTs 216.

In some implementations, the AgiDis service 214 detects IT/OT assets through the adaptor 234 and respective ADT 216. In some implementations, the AgiDis service 214 provides both active and passive scanning capabilities to comply with constraints, and identifies device and service vulnerabilities, improper configurations, and aggregate risks through automatic assessment. The discovered assets can be used to generate an asset inventory, and network maps. In general, the AgiDis service 214 can be used to discover assets in the enterprise network, and a holistic view of network and traffic patterns. More particularly, the AgiDis service 214 discovers assets, their connectivity, and their specifications and stores this information in the asset/vulnerabilities knowledge base 235. In some implementations, this is achieved through passive network scanning and device fingerprinting through the adaptor 234 and ADT 216. The AgiDis service 214 provides information about device models.

In the example of FIG. 2, the AgiInt service 212 includes a vulnerability analytics module 236 and a threat intelligence knowledge base 238 (e.g., CVE, CAPEC, CWE, iDefence API, vendor-specific databases). In some examples, the AgiInt service 212 discovers vulnerabilities in the enterprise network based on data provided from the AgiDis service 214. In some examples, the vulnerability analytics module 236 processes data provided from the AgiDis service 214 to provide information regarding possible impacts of each vulnerability and remediation options (e.g., permanent fix, temporary patch, workaround) for defensive actions. In some examples, the vulnerability analytics module 236 can include an application programming interface (API) that pulls out discovered vulnerabilities and identifies recommended remediations using threat intelligence feeds. In short, the AgiInt service 212 maps vulnerabilities and threats to discovered IT/OT assets. The discovered vulnerabilities are provided back to the AgiDis service 214 and are stored in the asset/vulnerabilities knowledge base 235 with their respective assets.

In the example of FIG. 2, the AgiHack service 208 includes an analytical attack graph (AAG) generator 226, an AAG database 228, and an analytics module 230. In general, the AgiHack service 208 generates AAGs using the resource-efficient AAG generation, and evaluates hacking exploitation complexity. In some examples, the AgiHack service 208 understands attack options, leveraging the vulnerabilities to determine how a hacker would move inside the network and identify targets for potential exploitation. The AgiHack service 208 proactively explores adversarial options and creates AAGs representing possible attack paths from the adversary's perspective.

In further detail, the AgiHack service 208 provides rule-based processing of data provided from the AgiDis service 214 to explore all attack paths an adversary can take from any asset to move laterally towards any target (e.g., running critical operations). In some examples, multiple AAGs are provided, each AAG corresponding to a respective target within the enterprise network. Further, the AgiHack service 208 identifies possible impacts on the targets. In some examples, the AAG generator 226 uses data from the asset/vulnerabilities knowledge base 236 of the AgiDis service 214, and generates an AAG. In some examples, the AAG graphically depicts, for a respective target, all possible impacts that may be caused by a vulnerability or network/system configuration, as well as all attack paths from anywhere in the network to the respective target. In some examples, the analytics module 230 processes an AAG to identify and extract information regarding critical nodes, paths for every source-destination pair (e.g., shortest, hardest, stealthiest), most critical paths, and critical vulnerabilities, among other features of the AAG. If remediations are applied within the enterprise network, the AgiHack service 208 updates the AAG.

In the example of FIG. 2, the AgiRem service 210 includes a graph explorer 232 and a summarizer 234. In general, the AgiRem service 210 provides remediation options to avoid predicted impacts. For example, the AgiRem service 210 provides options to reduce lateral movement of hackers within the network and to reduce the attack surface. The AgiRem service 210 predicts the impact of asset vulnerabilities on the critical processes and adversary capabilities along kill chain/attack paths and identifies the likelihood of attack paths to access critical assets and prioritizes the assets (e.g., based on shortest, easiest, stealthiest). The AgiRem service 210 identifies remedial actions by exploring attack graph and paths. For example, the AgiRem service 210 can execute a cyber-threat analysis framework that characterizes adversarial behavior in a multi-stage cyber-attack process, as described in further detail herein.

In further detail, for a given AAG (e.g., representing all vulnerabilities, network/system configurations, and possible impacts on a respective target) generated by the AgiHack service 208, the AgiRem service 210 provides a list of efficient and effective remediation recommendations using data from the vulnerability analytics module 236 of the AgiInt service 212. In some examples, the graph explorer 232 analyzes each feature (e.g., nodes, edges between nodes, properties) to identify any condition (e.g., network/system configuration and vulnerabilities) that can lead to cyber impacts. Such conditions can be referred to as issues. For each issue, the AgiRem service 210 retrieves remediation recommendations and courses of action (CoA) from the AgiInt service 212, and/or a security knowledge base (not shown). In some examples, the graph explorer 232 provides feedback to the analytics module 230 for re-calculating critical nodes/assets/paths based on remediation options. In some examples, the summarizer engine 234 is provided as a natural language processing (NLP) tool that extracts concise and salient text from large/unstructured threat intelligence feeds. In this manner, the AgiSec platform can convey information to enable users (e.g., security teams) to understand immediate remedial actions corresponding to each issue.

In the example of FIG. 2, the AgiBuiz service 206 includes an impact analyzer 220. In general, the AgiBuiz service 206 associates services that are provided by the enterprise with IT/OT assets, generates a security map, identifies and highlights risks and possible impacts on enterprise operations and industrial processes, and conducts what-if prediction analyses of potential security actions remediations on service health levels. In other words, the AgiBuiz service 206 identifies risk for each impact predicted by the AgiHack service 208. In some examples, the impact analyzer 220 interprets cyber risks and possible impacts (e.g., financial risk) based on the relative importance of each critical asset and its relative value within the entirety of the enterprise operations. The impact analyzer 220 processes one or more models to compare the financial risks caused by cyber-attacks with those caused by system unavailability due to shutdown time for replacing/patching critical assets.

In the example of FIG. 2, the AgiPro service 204 includes a prioritizing engine 222 and a scheduler 224. In some implementations, the AgiPro service 204 prioritizes the remediation recommendations based on their impact on the AAG size reduction and risk reduction on the value. In some examples, the AgiPro service 204 determines where the enterprise should preform security enforcement first, in order to overall reduce the risks discovered above, and evaluate and probability to perform harm based on the above lateral movements by moving from one CI to another. In some examples, the AgiPro service 204 prioritizes remedial actions based on financial risks or other implications, provides risk reduction recommendations based on prioritized remediations, and identifies and tracks applied remediations for risks based on recommendations.

In some examples, the prioritizing engine 222 uses the calculated risks (e.g., risks to regular functionality and unavailability of operational processes) and the path analysis information from the analytics module 230 to prioritize remedial actions that reduce the risk, while minimizing efforts and financial costs. In some examples, the scheduler 224 incorporates the prioritized CoAs with operational maintenance schedules to find the optimal time for applying each CoA that minimizes its interference with regular operational tasks.

As introduced above, cyber-threat analysis for a computer network leverages one or more AAGs. In some examples, an AAG is generated by a cyber-security platform, such as the AgiSec platform described herein. In mathematical terms, an AAG can be described as a directed graph modeled as AAG (V, E) with a set of nodes $V=\{v_1, \ldots, v_n\}$ and a set of edges $E=\{e_1, \ldots, e_m\}$ connecting nodes together, where $|V|=n$ and $|E|=m$.

Figure 3:
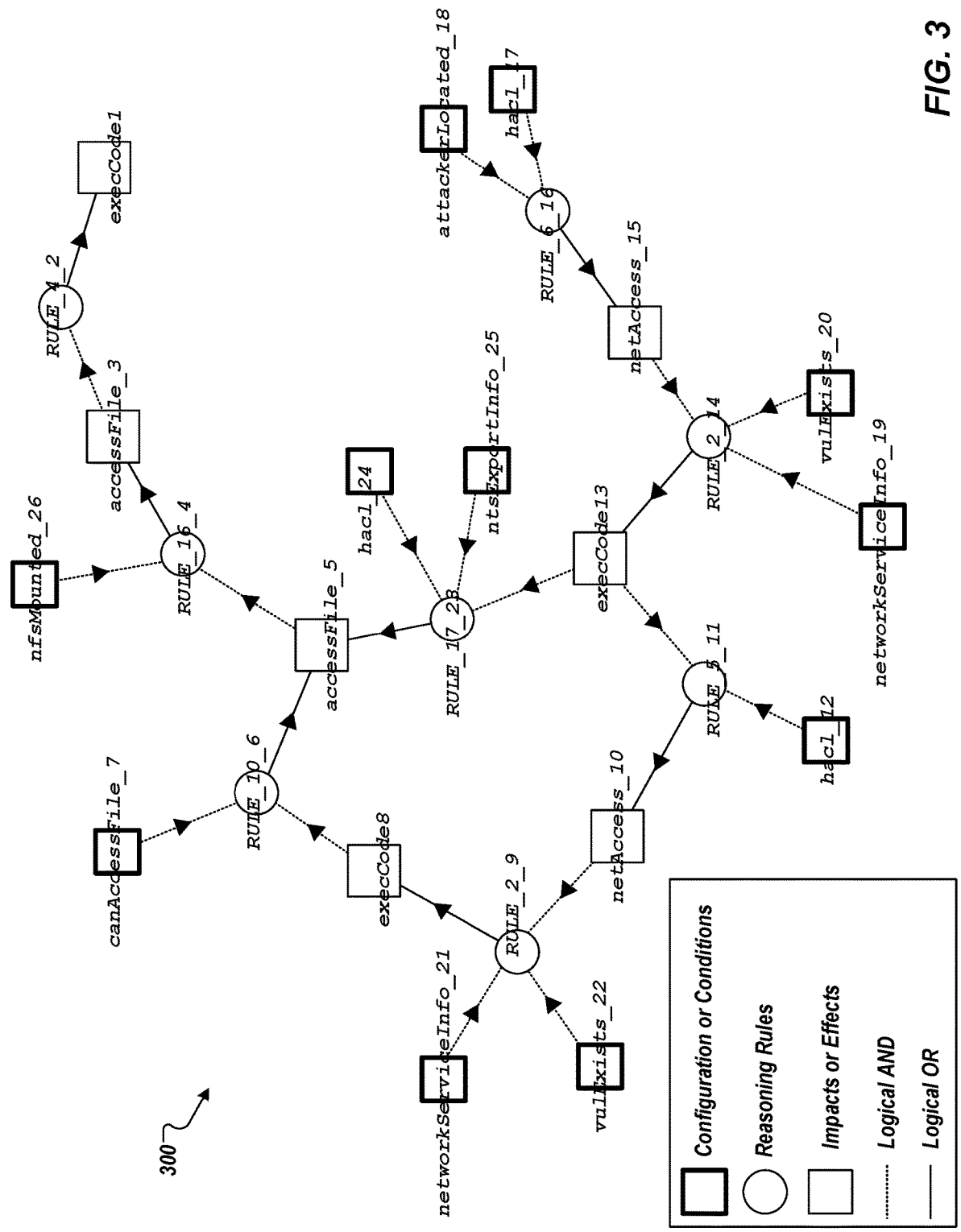
FIG. 3 depicts an example portion of an example analytical attack graph (AAG) to illustrate implementations of the present disclosure.

FIG. 3 depicts an example portion 300 of an example AAG to illustrate implementations of the present disclosure. As depicted in the example of FIG. 3, the AAG can include different node types to show how a set of network and system configurations result in unauthorized actions to specific targets. The example portion 300 is depicted in a database structure (e.g., Neo4j graph database structure). Nodes in an AAG are of different types: circular nodes representing system or network configurations that are the conditions that provide possibilities for actions by an attacker; circle-shaped nodes representing reasoning rules that represent the attack methodology leveraged by an attacker to achieve a particular goal; and square nodes that represent an impact as a sub-goal for a certain action an attacker could take. The AAG includes two types of edges: configuration-to-rule edges that represent logical AND (i.e., all configuration conditions have to be true to cause the impact; and rule-to-impact edges that represent logical OR (i.e., the impact happens if at least one rule is satisfied).

In general, the AAG is created by taking into account the configurations directed by some rules in order to make some impacts on the target network. In some examples, all configuration nodes, impact nodes, and rule nodes can be provided in sets $N_p$, $N_d$, $N_r$, respectively. Accordingly, $N_p = \{n_{p,j} | n_{p,j} \in V, \forall n_{p,j}$ is a configuration$\}$, $N_d = \{n_{d,j} | n_{d,j} \in V, \forall n_{d,j}$ is an impact$\}$, and $N_r = \{n_{r,j} | n_{r,j} \in V, \forall n_{r,j}$ is a rule$\}$. Consequently, the combination of these sets accounts for all vertices of the graph. In some examples, a configuration node is referred to herein as an input fact node indicating facts that are provided as input within a configuration. In some examples, impact nodes are referred to herein as derived fact nodes indicating a derived fact that results from applying one or more input facts and/or one or more derived facts to a rule.

AAGs can be used in cyber-threat analysis to determine attack paths of external attackers into and through a computer network. Use of AAGs in mitigating attacks on computer networks is described in further detail in commonly assigned U.S. application Ser. No. 16/554,846, entitled Generating Attack Graphs in Agile Security Platforms, and filed on Aug. 29, 2019, the disclosure of which is expressly incorporated herein by reference in the entirety for all purposes. Further, generation of AAGs is described in further detail in commonly assigned U.S. application Ser. No. 16/924,483, entitled Resource-efficient Generation of Analytical Attack Graphs, and filed on Jul. 9, 2020, the disclosure of which is expressly incorporated herein by reference in the entirety for all purposes.

To provide further context for implementations of the present disclosure, the AAG model presented in MulVAL will be briefly discussed. MulVAL can be described as an automatic end-to-end AAG generation framework. In general, MulVAL takes a specification, such as, but not limited to, MITRE Common Vulnerabilities and Exposures (CVE), describing the configuration of an enterprise network and rules that depict how an attacker can exploit the system configurations to advance in the enterprise network towards a target goal. MulVAL uses datalog as a specification language. In datalog, logical and physical entities of the enterprise network are formally modelled by datalog predicates; n-ary relations between entities are defined by datalog relations; and attack rules are modelled as datalog derivation rules in a datalog program. Derivation rules define preconditions (set of predicates connected by logical 'and') that, if met, derive new predicates. The specification of the predicates and derivation rules can be referred to as the datalog program of the system (enterprise network).

For purposes of illustration, a non-limiting example is introduced in Listing 1, below, which shows a specification of an example datalog program for an enterprise network (system).

predicates
.decl domainUser(user: UserFqdn, domain: Domain)
.decl groupContains(group: GroupFqdn, _principal: Principal)
.decl isUser(_user: UserFqdn)
.decl localGroup(host: Host, _groupName: GroupName, _groupFqdn: GroupFqdn)
.decl userInLocalGroup(host: Host, _groupName: GroupName, _user: UserFqdn)
.decl isUser(_user: UserFqdn, rule_id: String)
.decl groupContainsDirect(group: GroupFqdn, _principal: Principal)
attack rules
groupContains (Group, Principal):-groupContainsDirect (Group, Principal)
rule label: 28
isUser(User):-domainUser(User,_). #rule label: 80
userInLocalGroup(Host,GroupName,User):—
localGroup(Host,GroupName,GroupFqdn),groupContains(GroupFqdn,User,_),isUser(User,_).
rule label: 25

Listing 1: Example Datalog Program

The example datalog program of Listing 1 lists seven predicates. Each predicate is a function that maps objects of different types to a Boolean value. For example, the predicate domainUser maps objects of type user and objects of type Domain to True if the user belongs to the domain, and False otherwise.

The example datalog program of Listing 1 lists three attack rules. The first attack rule indicates that a predicate groupcontains is derived from the predicate groupContainsDirect (with the corresponding objects). The third attack rule indicates that three precondition predicates: isUser, localGroup, groupcontains derive the predicate userInLocalGroup (with the corresponding objects). Each rule has a unique identifier (id). For example, 28 for the first attack rule and 25 for the third attack rule.

The system configuration (e.g., instance of hosts, users, privileges on host, etc.) is provided as an array of facts (also referred to as grounds), each fact associated with a predicate of the datalog program. Table 1, below, lists four input facts of the is Domain predicate.

TABLE 1

Example Input Facts for domainUser

| | |
|---|---|
| <ADMINISTRATOR>@CYBER.LOCAL | CYBER.LOCAL |
| BERTHA.DAVIES@CYBER.LOCAL | CYBER.LOCAL |
| BRANDON.DAVIS@CYBER.LOCAL | CYBER.LOCAL |
| DANIELLE.HINTON@CYBER.LOCAL | CYBER.LOCAL |

The listed user-domain pairs represent mappings that are True. Combinations (of user and domain) that are not listed in the input facts are considered False, until proven otherwise (i.e., derived by a rule).

MulVAL uses a datalog solver on the program specification to check whether there exists an attack path from the input facts to a target goal. It does this by iteratively applying the derivation rules on facts until either reaching a target goal (a path exists) or reaching a fixed point, from which no new fact can be derived. In this case, no attack path to the target exists and the system is considered to be secure.

The derivation process from the grounded facts to the target goals is represented in the resulting AAG. An AAG is provided as a data object that records nodes and edges between nodes, described herein. The data object underlying an AAG can be processed to generate a visual representation, a graph, of the AAG.

In further detail, MulVAL generates an AAG that shows the derivation of grounded facts by the application of rules.

Formally, the AAG is defined as: AAG=($N_r$, $N_p$, $N_d$, E, L, Args, G), where $N_r$, $N_p$, $N_d$ are the sets of nodes (rules (r), input facts (p), and derived facts (d), respectively), E is a set of edges that connect from facts to derivation rules (precondition) and from derivation rules to derived facts, L is a mapping from a node (i.e., an input fact, a derived fact, a rule) to its label (i.e., the predicate or rule that it is associated with), Args is a mapping of facts to their arguments (i.e., objects they are associated with), and G∈$N_d$ describes the target goal (e.g., crown jewel that may be a target for hackers). N denotes the union of all node elements in the graph (i.e., N=$N_r$∪$N_p$∪$N_d$). In some examples, primitive nodes and derived nodes (i.e., fact nodes) are denoted by $N_f$, where $N_f$=$N_p$∪$N_d$. Every fact node in the graph is labeled with a logical statement in the form of a predicate applied to its arguments. In some examples, Args and L are separately encoded. For example, a configuration c={"DomainUser", "BERTHA.DAVIES@CYBER.LOCAL", "CYBER.LOCAL"} can be encoded as $N_p$={node_1}; L(node_1)="DomainUser"; Args(node_1)= ["BERTHA.DAVIES@CYBER.LOCAL", "CYBER.LOCAL"].

Every element of the AAG is uniquely identifiable. Each fact (input fact, derived fact) node is uniquely defined by its arguments and predicate label (i.e., no two nodes may have the same label and arguments). As described in further detail herein, a unique identifier (index) for each fact node can be provided based on this information. Every rule node is uniquely defined by its label, preconditions and derived fact. As also described in further detail herein, a unique index for each rule node can be provided based on this information. The AAG size can be defined as the number of nodes and edges in the AAG.

Figure 4:
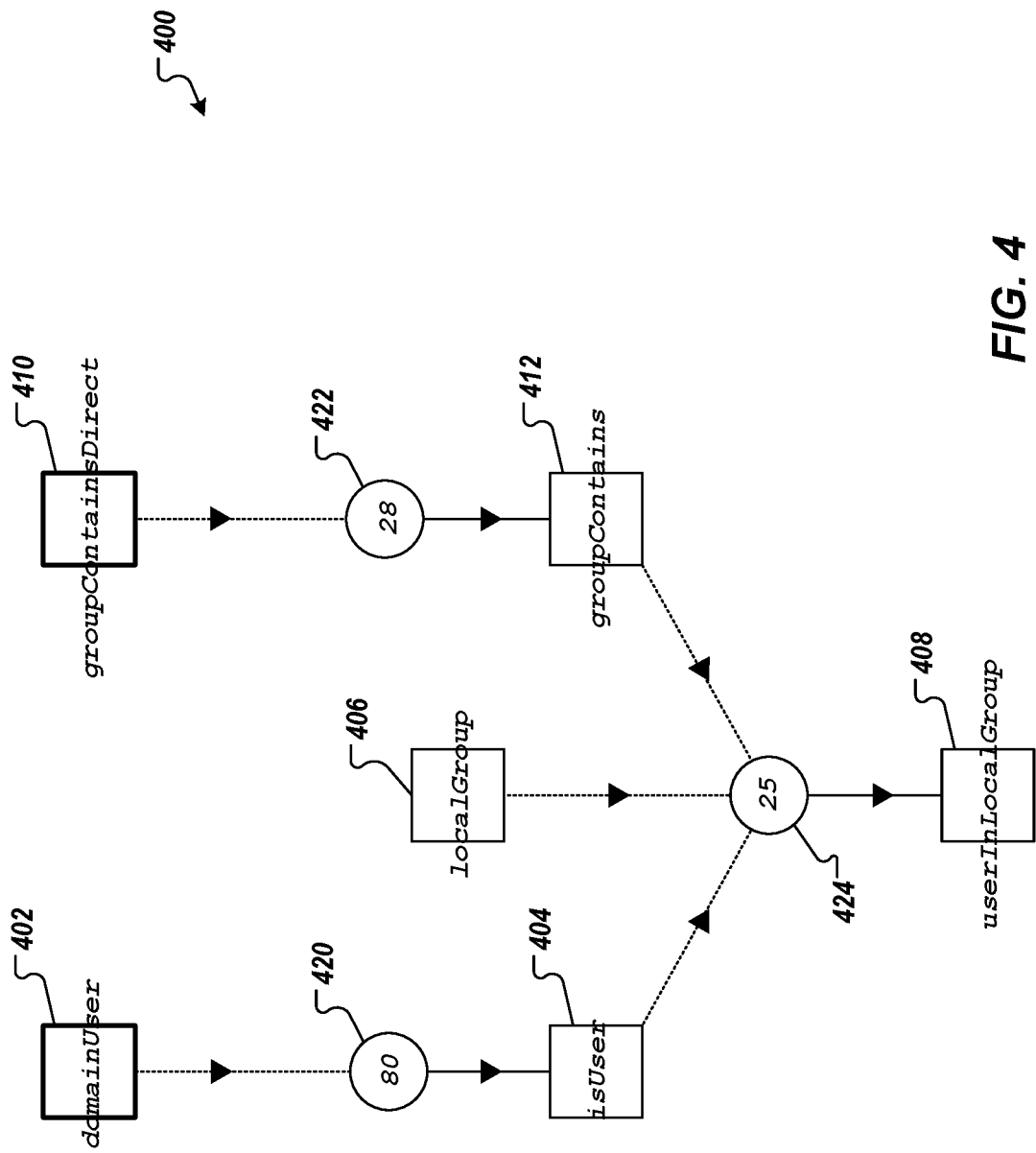
FIG. 4 depicts an example AAG based on the examples of Listing 1 and Table 1 below.

FIG. 4 depicts an example AAG 400 based on the examples of Listing 1 and Table 1. In the example of FIG. 4, squares represent predicates (fact nodes) and circles represent rules (rule nodes). The AAG 400 includes predicate nodes, which include fact nodes 402, 406, 410 and derived fact nodes 404, 408, 412. The AAG 400 also includes rule nodes 420, 422, 424. The AAG 400 presents the derivation order between predicates and includes fact, derived fact, and rule nodes. Each node is associated with its label and arguments (the arguments are absent FIG. 4 for clarity of presentation). For example, the domainUser fact node 402 correspond to the first row of Table 1. Initially, three facts are provided. These appear as predicate nodes 402, 406, 410 with no incoming transitions: domainUser, localGroup and groupContainsDirect. MulVal derives the fact nodes 404, 412 from domainUser and groupContainsDirect, by applying rule 80 and rule 28, respectively. The resulting nodes 404, 412 isUser and groupContains participate in the derivation of the fact UserInLocalGroup, represented as derived fact node 408.

In accordance with implementations of the present disclosure, and as described in further detail herein, abstracting an AAG is based on a topology equivalence between nodes of the AAG. More particularly, a bisimulation relation is defined and can be described as a binary relation between nodes of a graph that associate systems that behave the same way in the sense that one can simulate the other and vice-versa. In some examples, bisimulation is established when two nodes in graph cannot be distinguished by an external observer. Bisimulation applies when the nodes have similar topological properties. Specifically, the result of computing a maximum bisimulation between a graph and itself, allows one to find a smaller representation of the graph that preserves important topological properties. The result of computing a maximum bisimulation of an AAG is a compact, compressed representation that can be referred to as an abstracted AAG.

Given an AAG, a defense core, or defense-set, is a minimal subset of the AAG's rules whose removal will make the system safe (e.g., by preventing an attacker from reaching a crown jewel). Computing a defense core can be performed by running a defense algorithm over an AAG.

A defense algorithm determines whether a given set of removed rules prevents the goal from being achieved. This is done by trying to validate derived fact nodes until either the goal node is validated or until no more nodes can be validated.

Computing a defense core is computationally expensive and can become very slow or practically impossible on large AAGs. Thus, rather than computing the defense core on the original AAG directly, the defense core can be computed on the abstracted AAG. An abstracted AAG can be computed efficiently, and is generally much smaller than the original un-abstracted AAG.

While bisimulation between two graphs is known, implementations of the present disclosure provide for bisimulation for a single AAG. For bisimulation between two graphs, the following example definition is provided:

Given two graphs $G_1$=(N, E), $G_2$=(N, E) a bisimulation between $G_1$ and $G_2$ is a relation b⊆$N_1$×$N_2$ such that:

$u_1$ b $u_2$∧⟨$u_1$, $v_1$⟩∈$E_1$⇒∃$v_2$∈$N_2$($v_1$ b $v_2$∧⟨$u_2$, $v_2$⟩∈$E_2$)
$u_1$ b $u_2$∧⟨$u_2$, $v_2$⟩∈$E_1$⇒∃$v_1$∈$N_1$($v_1$ b $v_2$∧⟨$u_1$, $v_1$⟩∈$E_1$)

Definition 1: Bisimulation Between Two Graphs

More plainly stated, for two nodes to be bisimular, Definition 1 requires that any transition of one node can be matched by a transition to an equivalent node by the other node and vice-versa. This definition can be extended for computing bisimulation over labeled graphs using the following definition:

Let A and L be two finite sets of labels. Given a labeled graph G(N, E, l), with E⊆N×A×N and l:N→L, a labeled bisimulation on G is a relation b⊆N×N such that:

if $u_0$ b $u_1$, then l($u_0$)=l($u_1$)
if $u_0$ b $u_1$, then $$\text{for } i = 0, 1: \text{ if } u_i \stackrel{a}{\to} v_i \in E,$$

then there is an edge $$u_{1-i} \stackrel{a}{\to} v_{1-i} \in E \text{ and } v_0 b v_1$$

Definition 2: Bisimulation with Labeled Nodes

As described in further detail herein, implementations of the present disclosure provide an extended definition of bisimulation that not only accounts for the topological structure of an AAG, but also accounts for the data that is encoded in each node. The extended bisimulation of the present disclosure splits the data of nodes into multiple classes. Example classes include node labels, node arguments, and node types (e.g., whether a node is a goal). Further, an abstraction function is provided over arguments of a node. The following definitions are provided:

Let l∈L denote a label of a fact node ($N_f$). Recall that each node is associated with a mapping from arguments to values (e.g., host: "DC", user: "admin"). Abstract$_l$ denotes an abstraction function, which maps the arguments of predicate nodes with a label/to abstract values. I.e., let n denote a predicate node in G, then, abstract: $\langle v_1, v_2, \ldots, v_n \rangle \to \langle a_1, a_2, \ldots, a_n \rangle$, where $a_i \in D_i$ is some abstract domain.

Definition 3: Argument Abstraction

Let $G_1$, $G_2$ denote two attack graphs, a bisimulation is a binary relation between $BS \subseteq N_{G_1} \times N_{G_2}$, such that:
1. $(n_1, n_2) \in BS \leftrightarrow \forall e_1 \in E$, s.t., $e_{1,src}=n_1$, $\exists e_2 \in N_{G_2}$, s.t., $e_{2,src}=n_2 \wedge (e_{1,dst}, e_{2,dst}) \in BS$
2. $(n_1, n_2) \in BS \leftrightarrow \forall e_2 \in E$, s.t., $e_{2,src}=n_2$, $\exists e_1 \in N_{G_1}$, s.t., $e_{1,src}=n_1 \wedge (e_{1,dst}, e_{2,dst}) \in BS$
3. $(n_1, n_2) \in BS \leftrightarrow L(n_1)=L(n_2)$
4. $(n_1, n_2) \in BS \leftrightarrow abstract(Args(n_1))=abstract(Args(n_2))$
5. $(n_1, n_2) \in BS \leftrightarrow n_1 \in G \leftrightarrow n_2 \in G$ Definition 4: Bisimulation Definition In the above examples, abstract is used instead of abstract$_l$. Definition 4 requires topological consistency (requirements 1 and 2), data consistency (requirements 3 and 4), and type consistency (requirement 5) for nodes to be considered bisimular nodes. A computationally efficient algorithm is provided to compute bisimulation of labelled graphs G=(V, E, l), which can be used by encoding the labels, abstract arguments, and type as the node label in accordance with implementations of the present disclosure.

In some examples, by specifying as abstract$_{\exists/l L}$: $\langle v_1, v_2, \ldots, v_n \rangle \to \langle v_1, v_2, \ldots, v_n \rangle$ (Definition 5), the arguments of all nodes are maintained. In some examples, by specifying as abstract$_{\exists l \in L}$: $\langle v_1, v_2, \ldots, v_n \rangle \to \langle \emptyset, \emptyset, \ldots, \emptyset \rangle$ (Definition 6), all node arguments are ignored when testing for bisimulation. Accordingly, for any abstract function, bisimulation is reflexive, symmetric, transitive, and is, consequently, an equivalence relation.

In accordance with implementations of the present disclosure, the AAG is abstracted to provide an abstracted AAG based on the bisimulation of nodes of the AAG. More particularly, after identifying a group of bisimular nodes within the AGG, the bisimular nodes are collapsed to a single node, which can be referred to as an abstract node. Because bisimular nodes share label and type, each abstract node can be associated with label and type of one of its element nodes (also referred to as concrete nodes). In some examples, each abstract node is associated with a list of tuples of the arguments of the element nodes. In some examples, a rank is assigned to each abstract node, which is defined by a number of concrete nodes that underly the abstract node.

The following example definition is provided:
Let BS be a bisimulation relation over an attack graph G, and $P_{BS}$ denote the partition of nodes of G that it induces. Let p, denote a class of bisimular nodes in the partition $P_{BS}$, and by PBS(n) the partition that n∈G belongs to. Then, the induced abstract graph is defined as:

$$abstract(G) = (N_r, N_f, N_d, E, L, Args, G, \text{rank}), \text{ where}$$

$$N_r = \{P_{BS}(n) \mid n \in N_r\},$$

$$N_f = \{P_{BS}(n) \mid n \in N_f\},$$

$$N_d = \{P_{BS}(n) \mid n \in N_d\},$$

$$E = \{(P_{BS}(e_{src}), P_{BS}(e_{dst})) \mid e \in E\},$$

$$L(p) = L(n \in p),$$

$$Args(p) = \bigcup_{n \in p} Args(n),$$

$$G = \{P_{BS}(n) \mid n \in G\},$$

$$\text{rank}(p) = |p|$$

Definition 7: Induced Abstract Graph

It can be noted that the arguments abstraction function (e.g., Definition 3) enables fine-grained control over the abstraction level. This can be, for example, from no abstraction (e.g., when using the identity function (Definition 5)) to label abstraction (e.g., when using the label function (Definition 6)). This provides users with fine-grained abstraction given an analysis of interest. For example, a user may collapse all structurally bisimular nodes that share a host by mapping any node that has a host as part of its arguments to an abstract vector that only specifies the host. It can be noted that identity bisimulation is the most fine-grained bisimulation. For example, because each node is unique (in terms of its label and arguments), using identity bisimulation each node is only bisimular to itself. Thus, the induced graph is identical to the abstract graph, and no other bisimulation is finer. It can also be noted that label bisimulation is the coarsest bisimulation. For example, requirements 1-3, and 5 (see Definition 4) must be respected by the bisimulation relation. Consequently, by using abstract$_{\forall l \in L}$: $\langle v_1, v_2, \ldots, v_n \rangle \to \langle \emptyset, \emptyset, \ldots, \emptyset \rangle$, a function is provided that distinguishes between nodes by their arguments (as all nodes are mapped to a single abstract vector). Accordingly, because any abstract function must map all values to at least a single value, label bisimulation is the coarsest.

In an example network, the network has n domain users, each with a personal workstation and a server, both operating a particular operating system. All users belong to a special domain group with remote desktop protocol (RDP) access to all servers. All servers can use a network file sharing protocol (SMB) to share files and request services from the domain controller. One of the servers (server1) contains a local privilege escalation vulnerability, and the domain admin admin@example.domain is logged into the server.

An example attack scenario follows. In the example scenario, an attacker compromises a personal workstation using a social engineering technique that steals the user credentials. The attacker then connects to server1 by logging into it via RDP with the stolen user credentials. The attacker escalates her privileges on server1 using a local privilege escalation vulnerability. Then, the attacker uses a hacking tool to find the credentials of the logged domain admin. Finally, the attacker uses an operating system procedure with the stolen domain admin credentials to log on to domain controller via the SMB protocol with administrative privileges. From the domain controller the attacker effectively gains complete control over network, and so the domain is compromised.

Figure 5A:
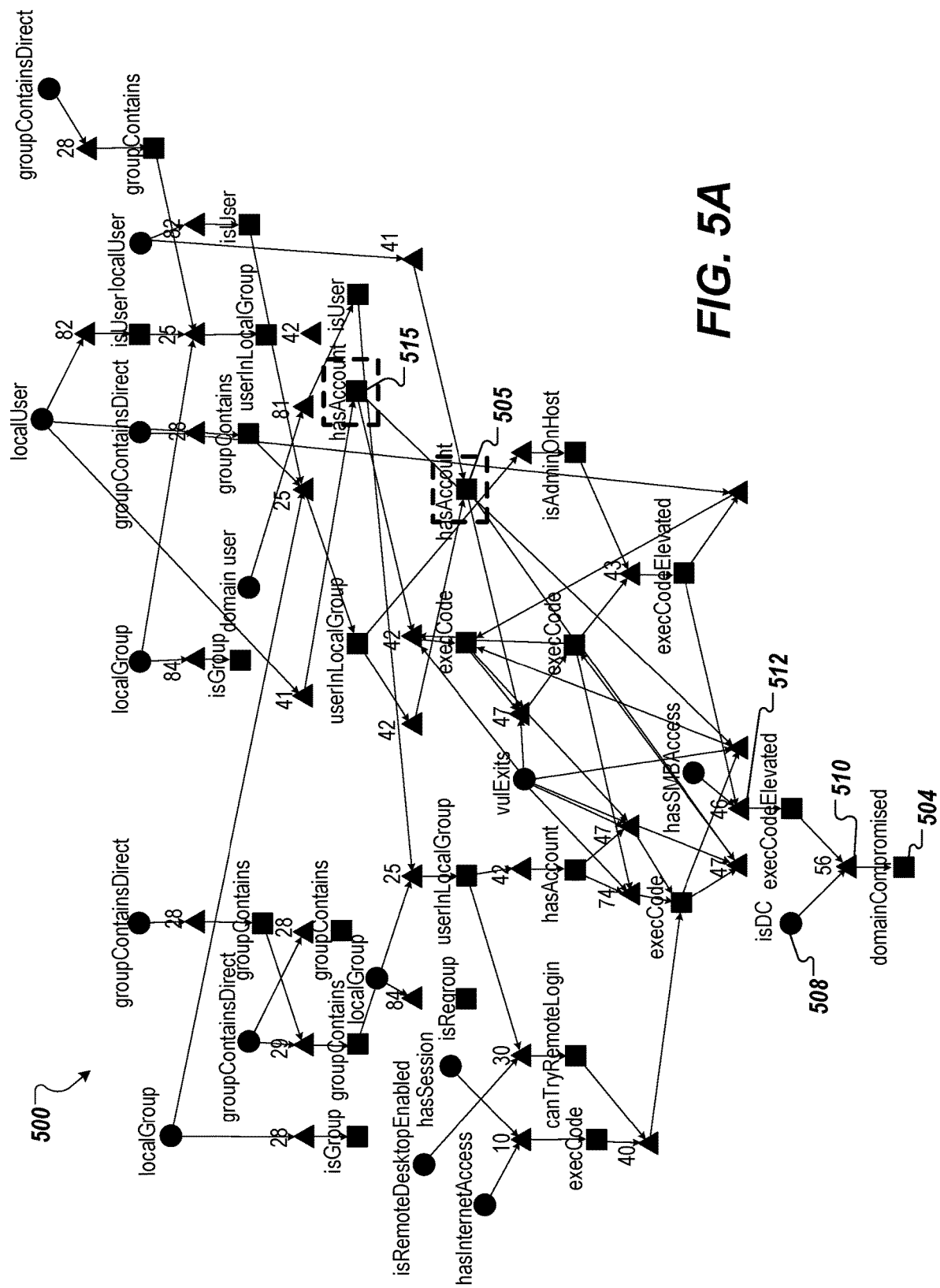
FIG. 5A depicts an example AAG.
Figure 5B:
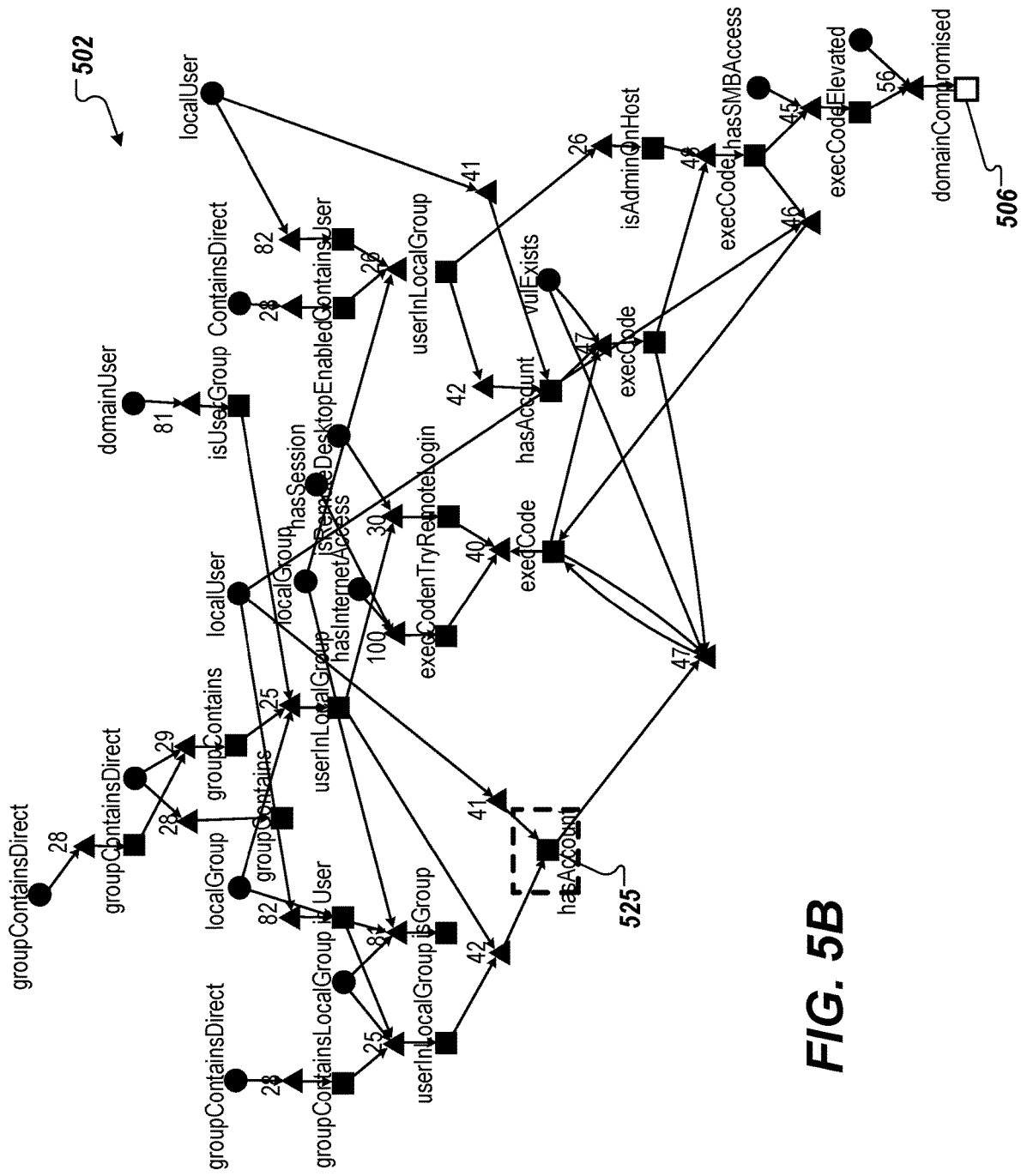
FIG. 5B depicts an example abstracted AAG that is provided by abstracting the example AAG of FIG. 5A in accordance with implementations of the present disclosure.

FIG. 5A depicts an example AAG 500 and FIG. 5B depicts an example abstracted AAG 502 that is provided by abstracting the example AAG 500 of FIG. 5A using label bisimulation. FIG. 5A shows a visualization of an AAG 500 that captures the scenario described above when the network has one domain user (n=1). The AAG 500 is automatically generated by a solver that takes a set of facts capturing the initial configuration of the system; a Datalog program that specifies predicates and logical implication rules; and a target goal. The solver produces an AAG that shows every possible derivation of the goal (i.e., attack).

Circle 508 represents a fact: isDC('domain_controller', 'example.domain'), which is included in the initial configuration. The fact encodes that DomainController is the domain controller for the example.domain. The following implication rule encodes that if an attacker gains elevated code execution privileges on a domain controller, then the domain is compromised: domainCompromised(Domain):-execCodeElevated (_, DC), isDC(DC, Domain). This rule is applied as the last step at triangle 510 to derive the attack goal represented by rectangle 504.

One common use of AAGs is to mitigate potential cyber threats. Different mitigation strategies exist, with some focusing on rectifying specific facts, and others on blocking potential lateral moves (i.e., Datalog rules) by installing security controls. In some examples, a set of rules (e.g., a defense-set) can be identified whose removal prevents all attacks towards the goal.

Rule 45 is represented by triangle 512 in AAG 500. The rule 45 encodes that if two hosts are connected via an SMB protocol and an attacker has elevated privileges on one, then the attacker can gain elevated privileges of the other. Removing this Datalog rule means that we prevent its applications, i.e., all rule nodes that are labeled 45 in the AAG 500 are prevented. As a result, the goal is no longer reachable, and thus the AAG 500 ceases to show possible attacks.

An obstacle when searching for a defense core relates to the size of the AAG, which dramatically increases with the size of the network. For example, scaling up the network by increasing the number of users n=1, 5, 50 yields AAGs with 135, 2565, and 1.3M nodes and edges respectively. Thus, as the network grows, finding a defense becomes a computationally expensive and long if not an impractical task.

While the number of possible attacks increases with the network size, many of the attacks share the same structure. Thus, bisimulation can be used to collapse or fold graph nodes with similar labels and graph topology so as to analyze a more compact yet still accurate representation of attack graphs.

FIG. 5B shows a visualization of the folded attack graph 502. Note that although the folded graph is smaller, the original graph 500 and the folded graph 502 exhibit the same set of labeled paths. For example, the two nodes represented by rectangles 505, 515 are labelled hasAccount. The nodes 505, 515 have the same label and graph topology (e.g., outgoing edges to the equally labeled nodes) and are folded into one node 525 in the graph 502.

In comparison to the one hundred thirty-five nodes and edges in the original graph 500, the folded graph 502 has only one hundred twelve nodes and edges. In other examples, folding the graphs of an example for n=1, 5, 50, the original graphs of sizes 135, 2565, and 1.3M nodes and edges are reduced to graphs with 112, 252, and 252 nodes and edges, respectively. Interestingly, note that the folded representation does not change when increasing n from 5 to 50, as in this case the newly added nodes are folded into existing folded nodes. The difference between a graph of size 1.3M and a graph of size 252 is significant in terms of scalability. Thus, folding can be leveraged to achieve faster defense analysis time for large AAGs.

An abstracted AAG is the minimum representation of an AAG. Facts are collapsed according to a maximum labeled bisimulation, while rules are not. That is, apart from considering the topology of the graph, nodes can become equivalent only if they keep the exact rule for rule nodes, and can become equivalent if they have the same predicate name (regardless of the arguments) for fact nodes.

The maximum labeled bisimuation relation exists and is unique. Note that this equivalence relation ranges over the whole set of nodes N. It is possible that two nodes, one from Nf and one from Nd, are equivalent. The quotient set uses the restriction of the relation to the set Nd (and similarly for Nf). The label function is well defined because rule nodes keep their label according to the bisimulation so different rules are never equivalent, and because fact nodes that become equivalent must have the same predicate name.

The preconditions supporting a derived fact in the AAG match the list of predicates appearing in the rule, including multiple appearances of the same predicate. In the abstracted AAG, only one node of each predicate name is needed to deduce the node. This may have the following consequences. First, a rule node in the abstracted AAG may have more incoming edges than the rule node in the original AAG. This can occur if not all incoming predicate nodes that share a label were folded, due to topological differences. Second, if an AAG rule for deriving predicate P1 requires two different instances of P2 (i.e., P1( . . . ): −P2( . . . ), P2( . . . ), . . . ), two different instances of P2 will appear in the AAG. However, as nodes may get folded in the abstracted AAG, the two incoming instances may merge in the abstracted AAG. This still complies with the semantics of the folded rule. The idempotency of the conjunction ensures that one instance of P2 is enough for both instances of P2 as they are indistinguishable without their arguments.

In an example, predicates P1 and P2 are needed in order to derive P. The abstracted AAG may contain many instances of P1 and P2 nodes leading to the rule node. This is because they may have outgoing edges to non-equivalent nodes, which forces the bisimulation to make them non-equivalent. However, not all pairs of P1 and P2 represent AAG nodes that match the rule, and thus not any such pair necessarily supports the derived node. Thus, a valid abstracted AAG does not necessarily indicate a valid AAG. The only established corollary is that when the abstracted AAG is not valid, the original AAG is not valid either. Thus, the disclosed techniques provide the advantage of ensuring that the complement of the defense-set is a maximally safe set of rules.

Implementations of the present disclosure provide that any abstract function applying bisimulation over an AAG is sound. An abstract function is sound, if, for every attack path over the original (concrete) AAG, there exists a corresponding label preserving attack path over the abstract AAG. This ensures that the structural representation of each attack path of the AAG is maintained in the abstract AAG. For example, t can denote a target node (crown jewel) in G. An attack path to t is a recursive derivation of the goal that stops on fact nodes. Formally, this can be defined as:

Let S denote a subgraph of G, with a set of nodes in G and the edges between them. S is an attack path to t, iff, $t \in S \land \forall n \in S$, s.t., $n \in N_r, \text{pred}(n) \subseteq S \land \forall n \in S$, s.t., $n \in N_d$, $\exists n' \in \text{pred}(n)$, s.t., $n' \in S$.

Definition 8: Attack Path

Definition 8 requires that t belongs to S; that, for every rule node, all preconditions are included in S; and that, for every derivable node, there exists some rule in S. This ensures that subgraph S (of G) includes a complete derivation of the target node through the intermediate rules and derivable nodes, all the way to the facts, from which the derivation began.

It can be noted that Definition 8 does not require that the attack path is minimal. In fact, the entire AAG can be considered as an attack path. The following definition ensure minimality:
Let S denote a set of nodes of G and the edges between them. S is an attack path to t, iff, $t \in S \wedge \forall n \in S$, s.t., $n \in N_r$, pred(n) $\subseteq S \wedge \forall n \in S$, s.t., $n \in N_d$, $\exists n' \in$ pred(n), s.t., $n' \in S \wedge (\forall n \in S$, s.t., $n \in N_d$, $\neg \exists n'$, n". $n' \in$ pred(n)$\wedge n' \in$ pred(n), s.t., n', n"$\in S)$ $\wedge \#C^1$: single derivation ($\forall n \in S$, s.t., $n \in N_p$, $\exists n'$. $n \in$ pred(n') $\wedge n' \in S \vee n = t) \# C^2$: no redundant predicates

Definition 9: Minimal Attack Path

In Definition 9, constraint $C^1$ requires that only a single derivation of each derivable node is included, and constraint $C^2$ requires that each predicate node in S is used as a pre-condition of some rule in S, except for the target node.

In some examples, S can be a set of nodes of a minimal attack path. Removing any node from S yields a set of nodes S', which is not an attack path. It can be assumed towards a contradiction, that there exists some node n, such that., removing on S yields S' which is an attack path. Since n can either be a rule node, a fact node or a derivable node, each case should be proven. If n is a rule node, then it must be an intermediate node on the attack path (as the recursive definition of attack paths requires stopping at fact nodes). Here, n' can be a derivable node derived by n. By constraint $C^1$, it results that n' can no longer be derived, thus S' is not an attack path. If n is a fact or derivable node that is different than the goal node, then by constraint $C^2$, it results that deriving some rule node in S therefore, removing it invalidates the attack path. Further, if n=t, the definition of an attack path is violated.

With an abstract AAG, an abstract attack path within the abstract AAG can be considered. For example:
Let S be a minimal attack path to t. The abstract attack path of S, denoted by abstract(S) removes the arguments of the nodes S.

Definition 10: Abstract Attack Path

Here, the abstract attack path maintains the topology, labels and types (e.g., goal or not) of the nodes of the original attack path. Soundness of this formulation can be considered. For example, G, and abstract(G) can be an AAG and its bisimulation abstraction (for a specification of abstract functions for all labels). Then, any attack path in G has a corresponding abstract attack path in abstract(G).

To prove this, and without loss of generality, S can be an attack path in G, BS can be a bisimulation relation as defined herein (Definition 4), and $P_{BS}$ denotes the partition of nodes of G that it induces. The abstract node in Abstract(G), which n belongs to, can be denoted by $P_{BS}(n)$. Then, abstract_path$_{BS}=\{P_{BS}(b)|n \in S\}$ is the abstract path in Abstract(G). From the definition of the induced abstract graph, it is seen that abstract_path$_{BS}$ has corresponding node labels and includes edges that correspond to the edges between the nodes of S in G. Further, by the definition of the induced graph, the partition which $g \in S$ belongs to is defined as a goal in Abstract(G). Thus, S has an abstract path in Abstract(G). Alternatively, Abstract(G) can be a label bisimulation abstraction (Definition 5). Then, any attack path in G has a single type bisimular abstract attack path in G. It can be noted that, in finer bisimulation relations (e.g., the identity) several label bisimular abstract attacks paths may be separated due to the arguments of their nodes (more precisely due to the abstraction over their arguments).

As described herein, the abstract AAG is useful as it provides a succinct and sound representation of the AAG that maintains structural properties of the original AAG. For each of the elements of the abstract AAG, there exists one or more elements in the AAG. By maintaining pointers between the concrete AAG and the abstract AAG, the abstract AAG can be navigated to obtain evidence from the concrete AAG on demand and in a linear time complexity. In some examples, the time complexity can be linear in the size of the abstract AAG and, in the worst case, can be $O(|E| \log |N|)$.

In some implementations, after computing bisimulation relation with respect to an AAG, dictionaries are created that encode the relation between abstract and concrete elements. For each abstract node, a set of identifiers (IDs) of concrete nodes associated with the abstract node is maintained. For each abstract edge (i.e., edge between two abstract nodes), a dictionary that maps the concrete nodes of each of the concrete edges to their outgoing concrete nodes is maintained.

Figure 6:
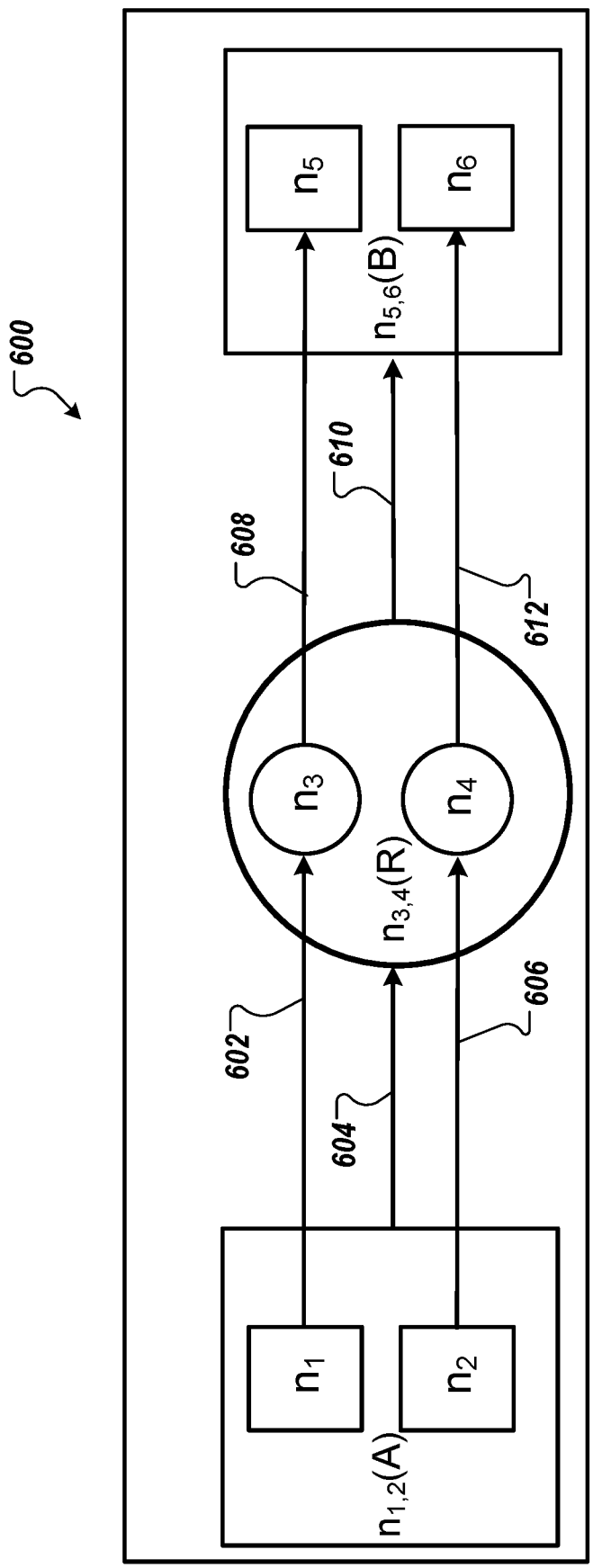
FIG. 6 depicts an example of concrete node and abstract node representations when using label bisimulation in accordance with implementations of the present disclosure.

FIG. 6 depicts an example portion of an AAG 600 including concrete node and abstract node representations when using label bisimulation in accordance with implementations of the present disclosure. The example AAG 600 includes two abstract nodes $n_{1,2}(A)$ and $n_{5,6}(B)$. Each abstract node represents two concrete nodes. For example, abstract node $n_{1,2}(A)$ represents concrete nodes $n_1$ and $n_2$. Abstract node $n_{5,6}(B)$ represents concrete nodes $n_5$ and $n_6$. The concrete nodes shown in FIG. 6 are connected by two concrete rule nodes. For example, $n_1$ connects to $n_5$ by concrete rule node $n_3$. Similarly, $n_2$ connects to $n_6$ by concrete rule node $n_4$. Abstract rule node $n_{3,4}(R)$ represents concrete rule nodes $n_3$ and $n_4$.

The AAG 600 includes concrete edges and abstract edges. For example, $n_1$ connects to $n_3$ by concrete edge 602, $n_3$ connects to $n_5$ by concrete edge 608, $n_2$ connects to $n_4$ by concrete edge 606, and $n_4$ connects to $n_6$ by concrete edge 612. Abstract edge 604 represents concrete edges 602, 606, and connects abstract node $n_{1,2}(A)$ to abstract node $n_{3,4}(R)$. Abstract edge 610 represents concrete edges 608, 612 and connects abstract node $n_{3,4}(R)$ to abstract node $n_{5,6}(B)$ The concrete AAG 600 is defined as:

$$AAG = \{N_f = \{n_1, n_2\}, N_r = \{n_3, n_4\}, N_d = \{n_5, n_6\}, E = \{(n_1, n_3), (n_2, n_4),$$
$$(n_3, n_5), (n_4, n_6)\}, L: \{n_1, n_2: A; n_3, n_4: R; n_5, n_6: B\} Args: \{n_1: \langle 'dc1' \rangle,$$
$$n_2: \langle 'dc2' \rangle n_5: \langle 'dc1' \rangle, n_6: \langle 'dc2' \rangle\}, G = \{n_5, n_6\}\}$$

By applying label representation, the following bisimulation relations can be provided:

$$BS = \{(n_1, n_2), (n_3, n_4), (n_5, n_6)\}$$

Accordingly, the following abstract AAG can be provided:

Abstract(AAG) =

$\{N_f = \{n_{1,2}\}, N_r = \{n_{3,4}\}, N_d = \{n_{5,6}\}, E = \{(n_{1,2}, n_{3,4}), (n_{3,4}, n_{5,6})\},$ $L: \{n_{1,2}: A; n_{3,4}: R; n_{5,6}: B\}, Args: \{n_{1,2}: \langle\emptyset\rangle, n_{5,6}: \langle\emptyset\rangle\}, G = \{n_{5,6}\}\}$ The abstract AAG can be encoded using the following dictionaries per abstract node and abstract edge:

$$n_{1,2} = \{n_1, n_2\},$$
$$n_{3,4} = \{n_3, n_4\},$$
$$n_{5,6} = \{n_5, n_6\},$$
$$(n_{1,2}, n_{3,4}) = \{n_1: [n_3], n_2: [n_4]\},$$
$$(n_{3,4}, n_{5,6}) = \{n_3: [n_5], n_4: [n_6]\}$$

Node, edge, and path enumeration is now considered. For this, and as noted above, a (concrete) AAG can be denoted by G and an abstract AAG by Abstract(G). In considering node enumeration, n can be an abstract node, and iterating all of the concrete nodes associated with it can be done in linear time (with respect to the number of concrete nodes) by iterating its set of concrete nodes. In considering edge enumeration, e can be an abstract edge, and iterating all of the concrete edges associated with it can be done in linear time (with respect to the number of concrete edges) by iterating its dictionary of encoding its concrete edges.

In considering path enumeration, $p=[n_1, n_2, \ldots, n_m]$ can be an abstract path and a procedure to obtain a single concrete path associated with it can be provided. Iteratively applying the procedure according to lexicographical order of nodes selection yields all concrete paths associated with it. For example, the set of concrete nodes of $n_1$ can be used and a concrete node $n'_1$ can be selected. The dictionary of the abstract edge ($n_1$, $n_2$) can be used to find all outgoing transitions from $n'_1$ to concrete nodes in $n_2$. For example, $n'_2 \in n_2$ can be such node, can be selected and the process repeated by selecting a concrete node that follows $n'_2$ in $n_3$. The process terminates when a concrete node in $n'_m \in n_m$ is reached.

As an example, FIG. 6 can be considered. In the example of FIG. 6, an abstract path A→R→B is provided. The first node $n_1$ (by lexicographical order) can be selected. Because A is followed by R on the abstract path, $n_3$ can be selected as the first concrete node from R that follows $n_1$. Because R is followed by B, $n_s$ can be selected as the first concrete node from B that follows to $n_3$. By continuing this process and keeping track of the last selections made, the second concrete path $n_2 \rightarrow n_4 \rightarrow n_6$ can be derived. Because there exists no other concrete paths to enumerate, the process terminates.

With regard to time complexity, selecting the first concrete node requires O(1) and then following each edge using the dictionary requires O(1). Consequently, the total complexity of traversing over a single path is linear in the length of the path (i.e., O(m)). As an immediate result, evidence of an attack path is obtained in linear time in the size of the attack path (because an attack path consists of several simple paths).

To further illustrate implementations of the present disclosure, example use cases can be considered. In a first example use case, the abstract AAG accommodates more easy display and discernment. For example, the examples of FIGS. 5A and 5B is taken from a computer-executable tool that enables a user to navigate between a concrete AAG and an abstract AAG, search and highlight graph elements, and find attack paths over both the AAG and the abstract AAG. In a second example use case, due to the soundness property, one may run different analytics over the abstract AAG, such as measuring effectiveness of cyber security controls, computing graph risk values, analyzing attack paths, finding cardinal nodes, and other types of analytics and statistics. This can dramatically improve scalability of the analytics (than running over the entire AAG) and the results can be used as approximations. In a third example use case, the abstraction adds a layer of graph representation, which the user can use to navigate and explore the underling system. For example, the user can collapse the (concrete) AAG and obtain the abstract AAG. The user can then navigate this layer of graph representation, search elements in the graph and investigate them. By clicking on an abstract node, the user can view the concrete elements that it includes.

The disclosed techniques can be used to efficiently predict cybersecurity attacks, identify cybersecurity remediations, and prioritize remediations. In some examples, abstract AAGs can be generated for various applications and use cases. For example, based on user input, a first abstract AAG can be generated that collapses nodes of an initial AAG using identity bisimulation. A second abstract AAG can be generated that collapses nodes of the initial AAG using label bisimulation. The two abstract AAGs each represent the initial AAG, and can be processed for use in different applications. In this way, different levels of abstraction can be performed based on user input that defines analyses to be performed using the abstracted AAGs.

The operations described herein include AAG computations from Datalog representation, abstracted AAG computations, and checking if the removal of rules leaves us with a safe set of rules.

Computing an abstracted AAG requires the computation of a maximum bisimulation for which we use PT, which has O(|E|log|V|) complexity. An example approach for the implementation of the check operation is to find which derivable nodes on an AAG or an AAG-fold are valid, instead of rerunning the reasoning engine on a smaller set of rules.

An approach for node validation is to go over all the nodes of the AAG or abstracted AAG. The running time can be improved by a heuristics of hashing a mapping between Datalog rules and their corresponding nodes in the graph. This eliminates the need to iterate over the nodes of the graph on every call to check with a different set of rules.

The folding time increases with the graph size. Folding the AAGs that include thousands of nodes and edges (fewer than 100 k) may be completed in, for example, a few milliseconds. Folding larger AAGs, including millions of nodes and edges, may be completed in, for example, between five and four hundred seconds.

In general, abstracted AAGs are significantly smaller than original AAGs. Relative sizes of abstracted AAGs can be, for example, between 0.01 to 0.85. While the folding time of the larger AAGs is not negligible, the resulting representations are dramatically smaller. Additionally, increasing the size of the graph does not always imply a larger abstracted AAG. Increasing the number of users n results in larger equivalence classes, yet does not necessarily introduce new equivalence classes. This highlights the ability of the approach to effectively fold nodes with a similar structure.

The running time for evaluating AAGs to obtain a defense set increases considerably with the size of the graphs. For AAGs with thousands of nodes and edges (fewer than 100 k), running times can be, less than one second (e.g., 0.1 seconds, 0.24 seconds, 0.3 seconds). For AAGs with millions of nodes and edges, running times can be hundreds of seconds (e.g., one hundred seconds, one hundred ninety-seconds, two hundred twenty seconds). For abstracted AAGs, the running time to obtain a defense set can be less than a tenth of a second (e.g., 0.003 seconds, 0.012 seconds, 0.013 seconds).

The number of rules identified in defense-sets generated using abstracted AAGs is slightly greater than using original AAGs. Identifying defense-sets using abstracted AAGs can result in defense-sets that are not minimal. A mean difference in the size of the defense set may be, for example, eight percent greater when using an abstracted AAG compared to an original AAG. Thus, the use of abstracted AAGs is effective and produces similar or only slightly larger defense-sets compared to those produced using original AAGs.

Abstracted AAGs can provide a fast means to compute an attack graph defense core, identifying a minimal set of changes to a cyber system that will prevent an attacker from reaching a crown jewel. To scale-up attack graph defense performance, bisimulation can be applied to attack graphs, and a defense-set can be computed over the resulting graphs. The use of bisimulation results in significantly smaller graphs and in defense-set computations that are significantly faster than a direct solution.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code) that constitutes processor firmware, a protocol stack, a database management system, an operating system, or a combination of one or more of them. A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display), LED (light-emitting diode) monitor, for displaying information to the user and a keyboard and a pointing device (e.g., a mouse or a trackball), by which the user may provide input to the computer. Other kinds of devices may be used to provide for interaction with a user as well; for example, feedback provided to the user may be any appropriate form of sensory feedback (e.g., visual feedback, auditory feedback, or tactile feedback); and input from the user may be received in any appropriate form, including acoustic, speech, or tactile input.

Implementations may be realized in a computing system that includes a back end component (e.g., as a data server), or that includes a middleware component (e.g., an application server), or that includes a front end component (e.g., a client computer having a graphical user interface or a Web browser through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN") (e.g., the Internet).

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for mitigating cyber security risk of an enterprise network, the computer-implemented method comprising:
   receiving an initial analytic attack graph (AAG) that is representative of paths within the enterprise network with respect to at least one target asset, the initial AAG comprising nodes and edges between the nodes;
   identifying, from the nodes of the initial AAG, a plurality of node groups, each node group including two or more nodes having at least one common attribute;
   generating an abstract AAG from the initial AAG, the abstract AAG including at least one abstract node, wherein each node group of the initial AAG is represented by a respective abstract node of the abstract AAG;
   storing, in a database, mapping data between an abstract node of the abstract AAG and the nodes of the respective node group of the initial AAG represented by the abstract node;
   determining a set of remedial actions at least partially based on the abstract AAG, wherein determining the set of remedial actions at least partially based on the abstract AAG comprises processing the abstract AAG with a cyber defense algorithm to identify a set of rule nodes to be removed from the initial AAG; and
   executing one or more remedial actions in the set of remedial actions to reduce a cyber security risk to the enterprise network.

2. The method of claim 1, wherein each node comprises one of a rule node, a fact node, or a derived fact node.

3. The method of claim 1, wherein attributes of nodes comprise labels, arguments, and types.

4. The method of claim 3, wherein the node groups of the initial AAG each include two or more nodes having a common label and type.

5. The method of claim 4, wherein each abstract node in the abstract AAG is associated with the common label and type of the respective node group of the initial AAG.

6. The method of claim 1, wherein processing the abstract AAG with the cyber defense algorithm to identify a set of rule nodes to be removed from the initial AAG comprises:
   determining, using the cyber defense algorithm, at least one abstract rule node to be removed from the abstract AAG; and
   identifying the set of rule nodes to be removed from the initial AAG by mapping the at least one abstract rule node of the abstract AAG to rule nodes of the initial AAG using stored the mapping data.

7. The method of claim 1, wherein the set of rule nodes comprises a locally minimal set of rules of which removal prevents all attacks to the at least one target asset.

8. The method of claim 1, wherein executing the one or more remedial actions in the set of remedial actions to reduce the cyber security risk to the enterprise network comprises removing rule nodes of the identified set of rule nodes from the initial AAG.

9. The method of claim 1, wherein the abstract AAG includes at least one abstract edge between two abstract nodes.

10. The method of claim 9, comprising storing, in a database, mapping data between an abstract edge of the abstract AAG and respective nodes of the initial AAG represented by the abstract nodes connected by the abstract edge.

11. The method of claim 1, wherein identifying the plurality of node groups in the initial AAG, each node group including two or more nodes having a common attribute comprises:
   searching the initial AAG for bisimular nodes, wherein each node group comprises two or more bisimular nodes.

12. The method of claim 11, wherein bisimular nodes have a common label and type.

13. A non-transitory computer-readable storage medium coupled to one or more processors and having instructions stored thereon which, when executed by the one or more processors, cause the one or more processors to perform operations for mitigating cyber security risk of an enterprise network, the operations comprising:
   receiving an initial analytic attack graph (AAG) that is representative of paths within the enterprise network with respect to at least one target asset, the initial AAG comprising nodes and edges between the nodes;
   identifying, from the nodes of the initial AAG, a plurality of node groups, each node group including two or more nodes having at least one common attribute;
   generating an abstract AAG from the initial AAG, the abstract AAG including at least one abstract node, wherein each node group of the initial AAG is represented by a respective abstract node of the abstract AAG;

storing, in a database, mapping data between an abstract node of the abstract AAG and the nodes of the respective node group of the initial AAG represented by the abstract node;

determining a set of remedial actions at least partially based on the abstract AAG, wherein determining the set of remedial actions at least partially based on the abstract AAG comprises processing the abstract AAG with a cyber defense algorithm to identify a set of rule nodes to be removed from the initial AAG; and executing one or more remedial actions in the set of remedial actions to reduce a cyber security risk to the enterprise network.

14. The non-transitory computer-readable storage medium of claim 13, wherein each node comprises one of a rule node, a fact node, or a derived fact node.

15. The non-transitory computer-readable storage medium of claim 13, wherein attributes of nodes comprise labels, arguments, and types.

16. The non-transitory computer-readable storage medium of claim 15, wherein the node groups of the initial AAG each include two or more nodes having a common label and type.

17. The non-transitory computer-readable storage medium of claim 16, wherein each abstract node in the abstract AAG is associated with the common label and type of the respective node group of the initial AAG.

18. A system, comprising:
a computing device; and
a computer-readable storage device coupled to the computing device and having instructions stored thereon which, when executed by the computing device, cause the computing device to perform operations for mitigating cyber security risk of an enterprise network, the operations comprising:

receiving an initial analytic attack graph (AAG) that is representative of paths within the enterprise network with respect to at least one target asset, the initial AAG comprising nodes and edges between the nodes;

identifying, from the nodes of the initial AAG, a plurality of node groups, each node group including two or more nodes having at least one common attribute;

generating an abstract AAG from the initial AAG, the abstract AAG including at least one abstract node, wherein each node group of the initial AAG is represented by a respective abstract node of the abstract AAG;

storing, in a database, mapping data between an abstract node of the abstract AAG and the nodes of the respective node group of the initial AAG represented by the abstract node;

determining a set of remedial actions at least partially based on the abstract AAG, wherein determining the set of remedial actions at least partially based on the abstract AAG comprises processing the abstract AAG with a cyber defense algorithm to identify a set of rule nodes to be removed from the initial AAG; and executing one or more remedial actions in the set of remedial actions to reduce a cyber security risk to the enterprise network.

* * * * *